(12) United States Patent
Fakoorian et al.

(10) Patent No.: US 11,818,724 B2
(45) Date of Patent: Nov. 14, 2023

(54) COMMUNICATION AFTER CHANGE IN BANDWIDTH PART

(71) Applicant: QUALCOMM Incorporated, San Diego, CA (US)

(72) Inventors: Seyed Ali Akbar Fakoorian, San Diego, CA (US); Seyedkianoush Hosseini, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 17/246,333

(22) Filed: Apr. 30, 2021

(65) Prior Publication Data

US 2021/0345389 A1 Nov. 4, 2021

Related U.S. Application Data

(60) Provisional application No. 63/019,172, filed on May 1, 2020.

(51) Int. Cl.
*H04W 72/12* (2023.01)
*H04W 72/23* (2023.01)
(Continued)

(52) U.S. Cl.
CPC ............ *H04W 72/23* (2023.01); *H04L 5/14* (2013.01); *H04W 72/569* (2023.01); *H04W 72/0446* (2013.01)

(58) Field of Classification Search
CPC ......... H04W 72/1289; H04W 72/1242; H04W 72/0446; H04W 72/0453; H04W 8/24;
(Continued)

(56) References Cited

U.S. PATENT DOCUMENTS

| 11,064,434 B2 * | 7/2021 | Lin ................ H04W 52/0206 |
| 2018/0279289 A1 * | 9/2018 | Islam ............... H04W 72/0446 |

(Continued)

FOREIGN PATENT DOCUMENTS

CN       108886804 A  * 11/2018   ........... H04L 5/0008

OTHER PUBLICATIONS

Huawei, HiSilicon et al.,"Overview of wider bandwidth operations",3GPP TSG RAN WG1 NR Ad Hoc Meeting, Qingdao, China, Jun. 27-30, 2017, R1-1709972, 9 pages (Year: 2017).*

(Continued)

*Primary Examiner* — Lan-Huong Truong
(74) *Attorney, Agent, or Firm* — Loza & Loza, LLP

(57) ABSTRACT

Aspects relate to determining whether to conduct a scheduled communication after a bandwidth part (BWP) for the scheduled communication has been changed. In some examples, a user equipment (UE) receives a first indication from a base station (BS) that schedules a communication associated with a first BWP. Subsequently, upon receiving a second indication (e.g., a DCI or a slot format indicator (SFI)) from the BS indicative of a change in the first BWP, the UE determines whether to conduct the scheduled communication. For example, the second DCI may indicate a change in a second BWP that imparts a change on the first BWP or the second DCI may explicitly indicate a change in the first BWP. As another example, an SFI may indicate that at least one symbol for the first BWP has been changed from uplink to downlink, or vice versa.

30 Claims, 17 Drawing Sheets

(51) Int. Cl.
*H04L 5/14* (2006.01)
*H04W 72/566* (2023.01)
*H04W 72/0446* (2023.01)

(58) Field of Classification Search
CPC ....... H04L 5/14; H04L 5/0007; H04L 5/0092; H04L 5/0096; H04L 5/0044
See application file for complete search history.

(56) References Cited

U.S. PATENT DOCUMENTS

| | | |
|---|---|---|
| 2019/0089502 A1* | 3/2019 | Yi .......................... H04W 16/14 |
| 2019/0349060 A1 | 11/2019 | Liao et al. |
| 2019/0364602 A1 | 11/2019 | Yi et al. |
| 2020/0213066 A1* | 7/2020 | Ma ....................... H04L 41/0853 |
| 2022/0132533 A1* | 4/2022 | Taherzadeh Boroujeni ................ H04L 5/0094 |

OTHER PUBLICATIONS

International Search Report and Written Opinion—PCT/US2021/030367—ISA/EPO—dated Aug. 2, 2021.
Samsung: "Multiple Active Configured Grants for URLLC", 3GPP TSG RAN WG1 #96bis, 3GPP Draft, R1-1904445, 3rd Generation Partnership Project (3GPP), Mobile Competence Centre, 650, Route Des Lucioles, F-06921 Sophia-Antipolis Cedex, France, Xi'an, China, vol. RAN WG1, Apr. 8, 2019-Apr. 12, 2019, Apr. 12, 2019 (Apr. 12, 2019), pp. 1-5, XP051707222, p. 3.

* cited by examiner

| NR operating band | Uplink (UL) operating band BS receive / UE transmit $F_{UL\_low} - F_{UL\_high}$ | Downlink (DL) operating band BS transmit / UE receive $F_{DL\_low} - F_{DL\_high}$ | Duplex Mode |
|---|---|---|---|
| n1 | 1920 MHz – 1980 MHz | 2110 MHz – 2170 MHz | FDD |
| n2 | 1850 MHz – 1910 MHz | 1930 MHz – 1990 MHz | FDD |
| n3 | 1710 MHz – 1785 MHz | 1805 MHz – 1880 MHz | FDD |
| n5 | 824 MHz – 849 MHz | 869 MHz – 894 MHz | FDD |
| n7 | 2500 MHz – 2570 MHz | 2620 MHz – 2690 MHz | FDD |
| n8 | 880 MHz – 915 MHz | 925 MHz – 960 MHz | FDD |
| n12 | 699 MHz – 716 MHz | 729 MHz – 746 MHz | FDD |
| n20 | 832 MHz – 862 MHz | 791 MHz – 821 MHz | FDD |
| n25 | 1850 MHz – 1915 MHz | 1930 MHz – 1995 MHz | FDD |
| n28 | 703 MHz – 748 MHz | 758 MHz – 803 MHz | FDD |
| n34 | 2010 MHz – 2025 MHz | 2010 MHz – 2025 MHz | TDD |
| n38 | 2570 MHz – 2620 MHz | 2570 MHz – 2620 MHz | TDD |
| n39 | 1880 MHz – 1920 MHz | 1880 MHz – 1920 MHz | TDD |
| n40 | 2300 MHz – 2400 MHz | 2300 MHz – 2400 MHz | TDD |
| n41 | 2496 MHz – 2690 MHz | 2496 MHz – 2690 MHz | TDD |
| n50 | 1432 MHz – 1517 MHz | 1432 MHz – 1517 MHz | TDD |
| n51 | 1427 MHz – 1432 MHz | 1427 MHz – 1432 MHz | TDD |
| n66 | 1710 MHz – 1780 MHz | 2110 MHz – 2200 MHz | FDD |
| n70 | 1695 MHz – 1710 MHz | 1995 MHz – 2020 MHz | FDD |
| n71 | 663 MHz – 698 MHz | 617 MHz – 652 MHz | FDD |
| n74 | 1427 MHz – 1470 MHz | 1475 MHz – 1518 MHz | FDD |
| n75 | N/A | 1432 MHz – 1517 MHz | SDL |
| n76 | N/A | 1427 MHz – 1432 MHz | SDL |
| n77 | 3300 MHz – 4200 MHz | 3300 MHz – 4200 MHz | TDD |
| n78 | 3300 MHz – 3800 MHz | 3300 MHz – 3800 MHz | TDD |
| n79 | 4400 MHz – 5000 MHz | 4400 MHz – 5000 MHz | TDD |
| n80 | 1710 MHz – 1785 MHz | N/A | SUL |
| n81 | 880 MHz – 915 MHz | N/A | SUL |
| n82 | 832 MHz – 862 MHz | N/A | SUL |
| n83 | 703 MHz – 748 MHz | N/A | SUL |
| n84 | 1920 MHz – 1980 MHz | N/A | SUL |
| n86 | 1710 MHz – 1780 MHz | N/A | SUL |

Examples of Paired Spectrum 402

Examples of Unpaired Spectrum 404

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | F | U | U | U |
| 32 | D | D | D | D | D | D | D | D | D | F | F | U | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56 – 254 | Reserved | | | | | | | | | | | | | |

FIG. 6

COMMUNICATION AFTER CHANGE IN BANDWIDTH PART

CROSS-REFERENCE TO RELATED APPLICATION(S)

The present application for patent claims priority to and the benefit of U.S. Provisional Application No. 63/019,172, titled "COMMUNICATION AFTER CHANGE IN BANDWIDTH PART" filed May 1, 2020, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to communication after a change in a bandwidth part (BWP).

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second BS.

A BS may schedule access to a cell to support access by multiple UEs. For example, a BS may allocate different resources (e.g., time domain and frequency domain resources) for different UEs operating within a cell of the BS.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a user equipment is disclosed. The method may include transmitting a first indication to a base station and receiving a second indication from the base station. The first indication may indicate that the user equipment supports full-duplex communication on a single carrier and the second indication may specify that the user equipment is to communicate first information via a set of symbols in a slot associated with a first bandwidth part (BWP). The method may also include receiving a third indication from the base station after receiving the second indication, identifying a change to the first BWP from the third indication, and selectively communicating the first information after identifying the change to the first BWP.

In some examples, a user equipment may include a transceiver, a memory, and a processor coupled to the transceiver and the memory. The processor and the memory may be configured to transmit a first indication to a base station via the transceiver and receive a second indication from the base station via the transceiver. The first indication may indicate that the user equipment supports full-duplex communication on a single carrier and the second indication may specify that the user equipment is to communicate first information via a set of symbols in a slot associated with a first bandwidth part (BWP). The processor and the memory may also be configured to receive a third indication from the base station via the transceiver after the second indication is received, identify a change to the first BWP from the third indication, and selectively communicate the first information after the change to the first BWP is identified.

In some examples, a user equipment may include means for transmitting a first indication to a base station and means for receiving a second indication from the base station. The first indication may indicate that the user equipment supports full-duplex communication on a single carrier and the second indication may specify that the user equipment is to communicate first information via a set of symbols in a slot associated with a first bandwidth part (BWP). The user equipment may also include means for receiving a third indication from the base station after receiving the second indication, means for identifying a change to the first BWP from the third indication, and means for selectively communicating the first information after identifying the change to the first BWP.

In some examples, an article of manufacture for use by a user equipment includes a non-transitory computer-readable medium having stored therein instructions executable by one or more processors of the user equipment to transmit a first indication to a base station and receive a second indication from the base station. The first indication may indicate that the user equipment supports full-duplex communication on a single carrier and the second indication may specify that the user equipment is to communicate first information via a set of symbols in a slot associated with a first bandwidth part (BWP). The computer-readable medium may also have stored therein instructions executable by one or more processors of the user equipment to receive a third indication from the base station after the second indication is received, identify a change to the first BWP from the third indication, and selectively communicate the first information after the change to the first BWP is identified.

In some examples, a method for wireless communication at a base station is disclosed. The method may include receiving a first indication from a user equipment. The first indication may indicate that the user equipment supports full-duplex communication on a single carrier. The method may also include generating a second indication that specifies that the user equipment is to communicate first information during a set of symbols in a slot associated with a first bandwidth part (BWP), transmitting the second indication to the user equipment, generating a third indication that indicates a change to the first BWP, transmitting the third indication to the user equipment after transmitting the second indication, and communicating with the user equipment after transmitting the third indication.

In some examples, a base station may include a transceiver, a memory, and a processor communicatively coupled to the transceiver and the memory. The processor and the memory may be configured to receive a first indication from a user equipment via the transceiver. The first indication may indicate that the user equipment supports full-duplex communication on a single carrier. The processor and the memory may also be configured to generate a second indication that specifies that the user equipment is to communicate first information during a set of symbols in a slot associated with a first bandwidth part (BWP), transmit the second indication to the user equipment via the transceiver, generate a third indication that indicates a change to the first BWP, transmit the third indication to the user equipment via the transceiver after the second indication is transmitted, and communicate with the user equipment via the transceiver after the third indication is transmitted.

In some examples, a base station may include means for receiving a first indication from a user equipment. The first indication may indicate that the user equipment supports full-duplex communication on a single carrier. The base station may also include means for generating a second indication that specifies that the user equipment is to communicate first information during a set of symbols in a slot associated with a first bandwidth part (BWP), means for transmitting the second indication to the user equipment, means for generating a third indication that indicates a change to the first BWP, wherein the means for transmitting is further for transmitting the third indication to the user equipment after transmitting the second indication, and means for communicating with the user equipment after transmitting the third indication.

In some examples, an article of manufacture for use by a base station includes a non-transitory computer-readable medium having stored therein instructions executable by one or more processors of the base station to receive a first indication from a user equipment. The first indication may indicate that the user equipment supports full-duplex communication on a single carrier. The computer-readable medium may also have stored therein instructions executable by one or more processors of the base station to generate a second indication that specifies that a user equipment is to communicate first information during a set of symbols in a slot associated with a first bandwidth part (BWP), transmit the second indication to the user equipment, generate a third indication that indicates a change to the first BWP, transmit the third indication to the user equipment after the second indication is transmitted, and communicate with the user equipment after the third indication is transmitted.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 4 is a diagram of an example of operating bands according to some aspects.

FIG. 6 is a diagram of an example of a slot format according to some aspects.

DETAILED DESCRIPTION

Figure 1:
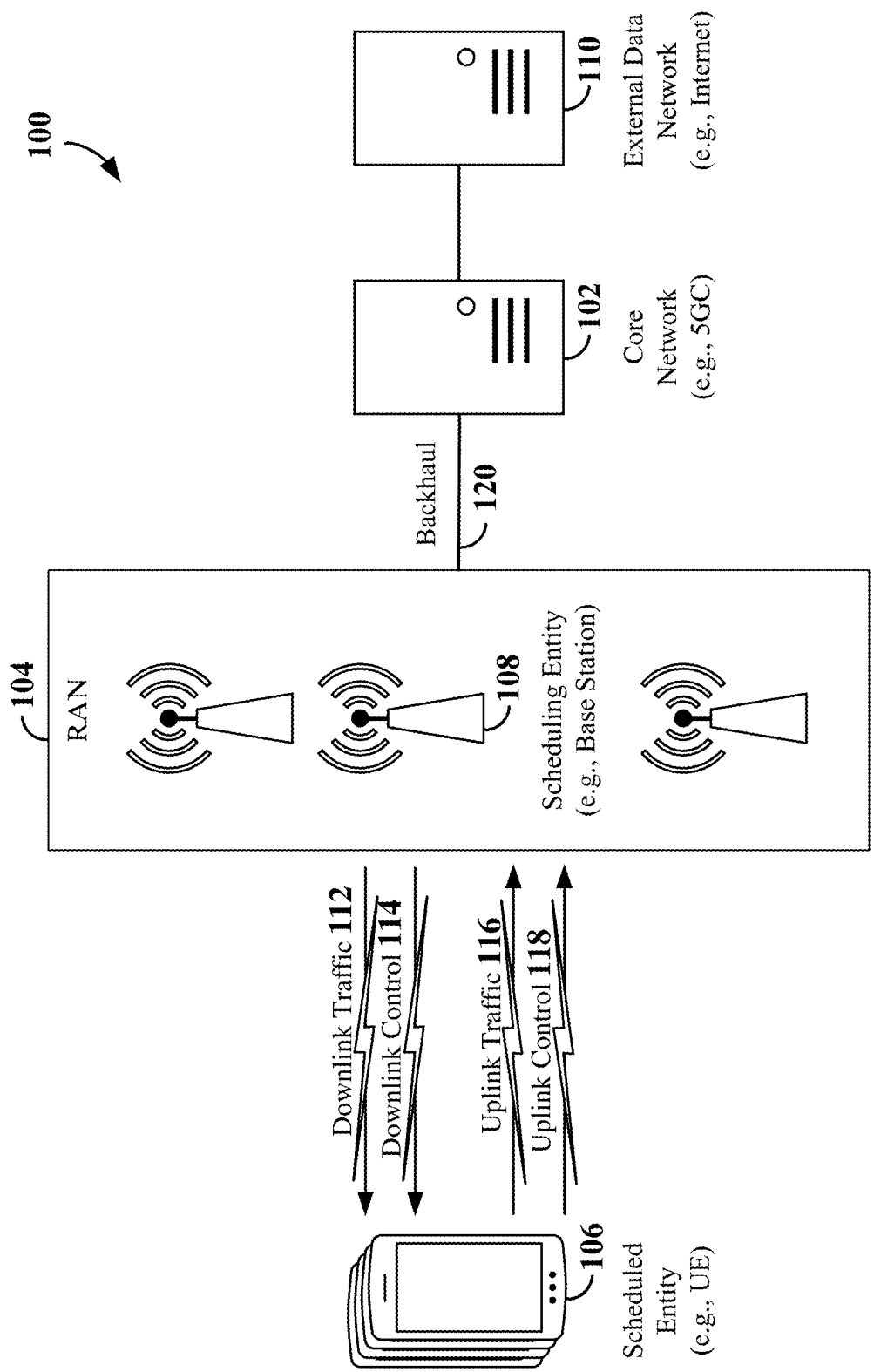
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to determining whether to conduct a scheduled communication after determining that a bandwidth part (BWP) for the scheduled communication has been changed. In some examples, the scheduled communication is semi-statically configured (e.g., as opposed to being dynamically configured only). For example, the scheduled communication may be a semi-persistently scheduled-physical downlink shared channel (SPS-PDSCH), a channel state information-reference signal (CSI-RS), or some other type of configured downlink communication. As another example, the scheduled communication may be a configured grant-physical uplink shared channel (CG-PUSCH), a sounding reference signal (SRS), or some other type of configured uplink communication.

In some examples, a user equipment (UE) receives a first indication from a base station (BS) that schedules a communication associated with a first BWP. Subsequently, the UE receives a second indication (e.g., downlink control information (DCI) or a slot format indicator (SFI)) from the BS.

The UE may determine based on the second indication that there is a change in the first BWP. For example, the second indication (e.g., a DCI) may explicitly indicate that there is a change in the first BWP. As another example, the second indication (e.g., a DCI) may indicate a change in a second BWP (e.g., an UL BWP) that imparts a change on the first BWP (e.g., a DL BWP). As a further example, the second indication (e.g., an SFI) may indicate that at least one symbol for the first BWP has been changed from uplink to downlink or vice versa.

Upon determining that there is a change in the first BWP, the UE may determine whether to conduct the scheduled communication. For example, if the change in the first BWP impacts the scheduled communication (e.g., at least one symbol of an originally scheduled transmission has subsequently been scheduled or reserved for receiving, or vice versa), the user equipment may abort the scheduled communication. Conversely, if the change in the first BWP does not impact the scheduled communication (e.g., the symbols to be used for the originally scheduled transmission are not impacted), the user equipment may conduct the scheduled communication.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
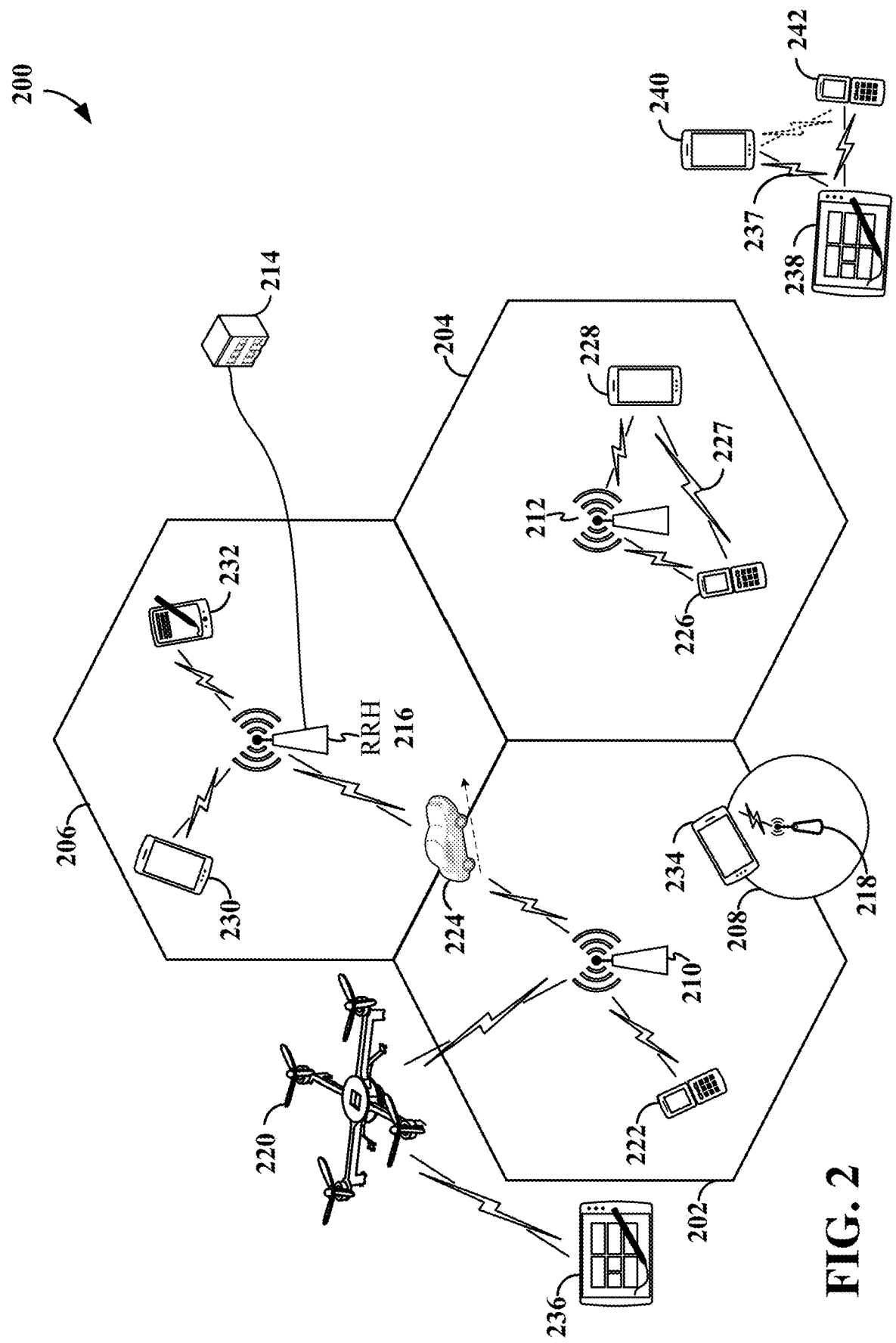
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms Duplex refers to a point-to-point communication link where both endpoints can communicate with one another in both directions. Full-duplex (FD) means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
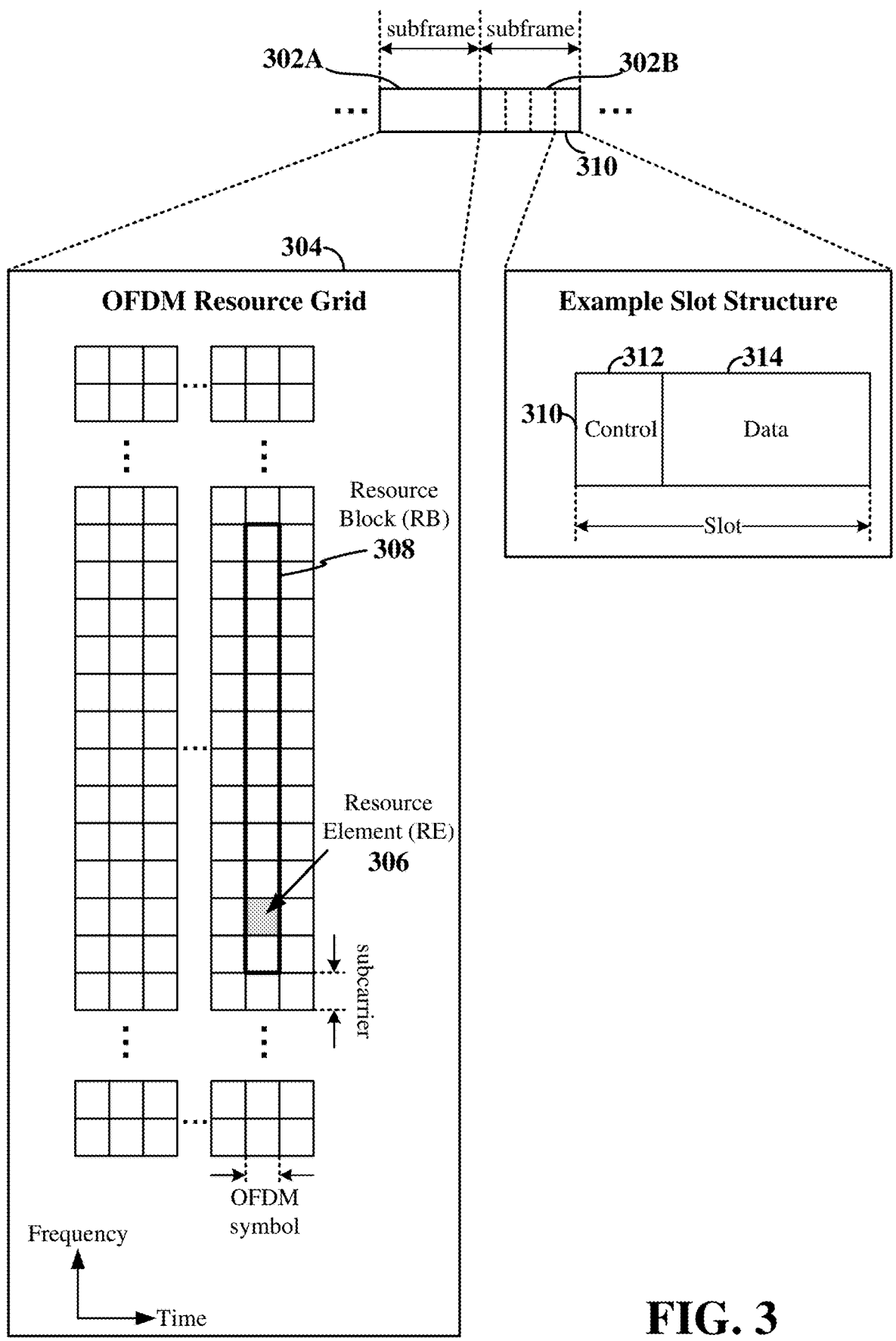
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 13 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

As mentioned above, a base station may send an UL grant or a DL grant to a UE. An UL grant may specify, for example, which resource blocks and/or which modulation and coding scheme (MCS) the BS has allocated to the UE for an UL transmission. A DL grant may specify, for example, which resource blocks and/or which MCS the BS will use for a DL transmission. Different types of grants may be used in different examples.

For a dynamic grant, a base station may send a DCI to a UE to schedule an individual transmission or reception (e.g., on physical downlink shared channel (PDSCH) or a physical uplink shared channel (PUSCH)). For example, after a UE requests uplink resources, a base station may send a first DCI to schedule a first PUSCH transmission by the UE. Then, after a UE requests additional uplink resources, the base station may send a second DCI to schedule a second PUSCH transmission, and so on.

For a configured grant (also referred to as a grant-free scheduling), a base station may configure uplink resources without having received a request for uplink resources from a UE. For example, the base station may send a DCI or a radio resource control (RRC) message to indicate that certain uplink resources have been pre-configured. In some implementations, a base station may send a DCI or an RRC message to activate or deactivate a configured grant.

A base station may also use semi-persistent scheduling (SPS) to schedule multiple transmissions (e.g., on PDSCH). In some examples, a base station may transmit an RRC message to configure an SPS (e.g., for a particular cell and a particular BWP) and subsequently send a DCI to activate the SPS. The SPS configuration may indicate an SPS periodicity between SPS occasions. In this way, the SPS configuration may schedule multiple SPS occasions at the indicated periodicity. In some examples, the periodicity may be referenced to a system frame number (SFN) and a sub-frame number of the DCI that initializes the SPS.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., an Rx V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

A wireless communication network may designate frequency bands for paired use (e.g., FDD) or unpaired use (e.g., TDD). For example, two frequency bands may be paired for FDD communication whereby one of the frequency bands is used for UL communication and the other frequency band is used for DL communication. In contrast, an unpaired band may be used for TDD communication where some slots in the band are used for DL communication and some slots in the band are used for UL communication.

FIG. 4 illustrates an example of several NR operating bands 400 where some of the bands have been designated as paired spectrum and some of the bands have been designated as unpaired spectrum. For example, the NR operating bands n1-n28 are designated as paired spectrum 402 for FDD communication. Thus, two of these bands may be paired for UL and DL communication. In contrast, the NR operating bands n40-n50 are designated as unpaired spectrum 404 for TDD communication. Thus, each of these bands may be used for both UL and DL communication.

Figure 5:
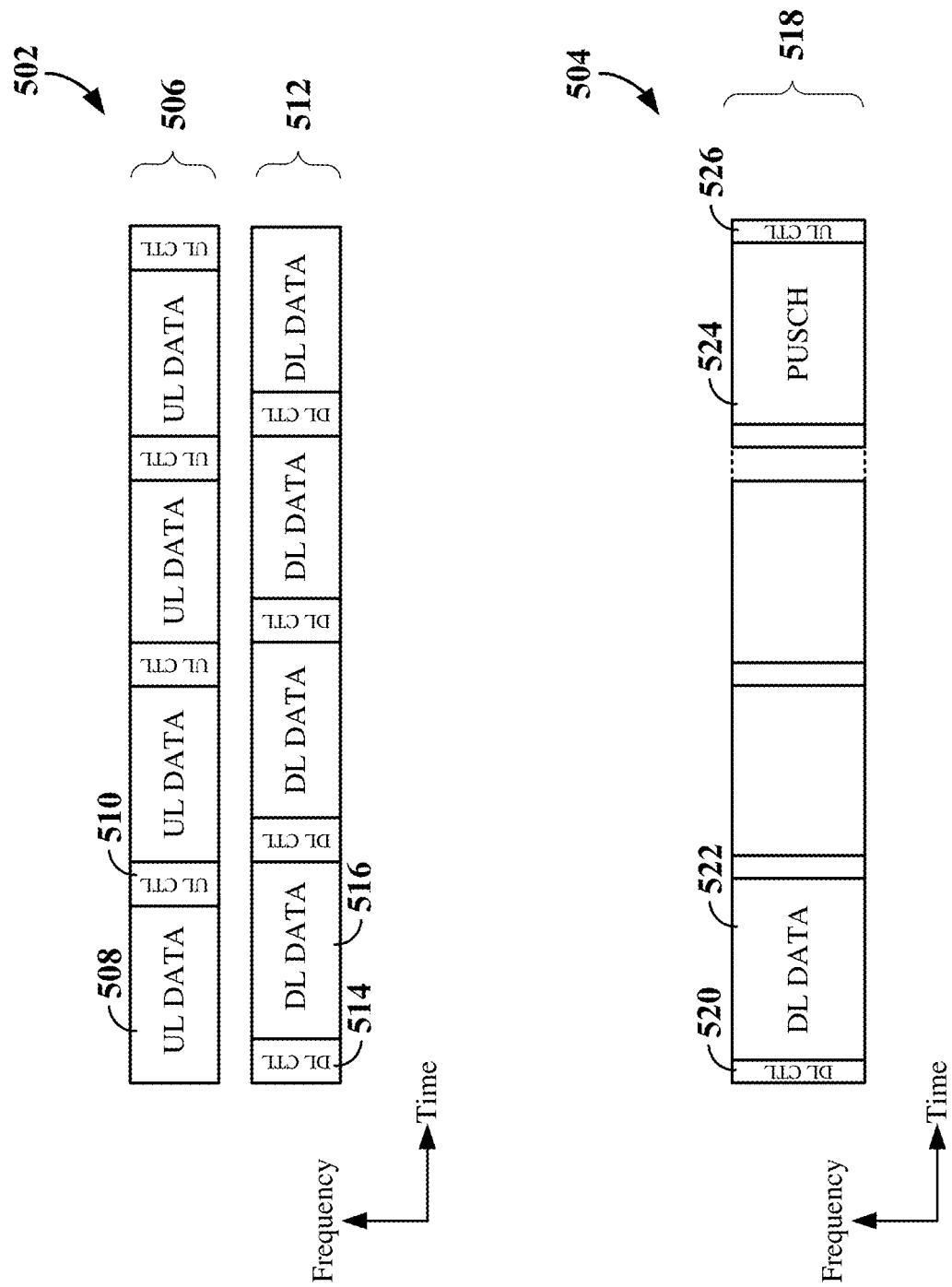
FIG. 5 is a diagram of an example of time slots for paired spectrum and unpaired spectrum according to some aspects.

FIG. 5 illustrates an example of time slots for FDD in paired spectrum 502 and time slots for TDD in unpaired spectrum 504. For the paired spectrum 502, a first frequency band 506 carries UL data (e.g., UL DATA 508) and UL control (e.g., UL CTL 510), while a second frequency band 512 carries DL data (e.g., DL DATA 514) and DL control (e.g., DL CTL 516). For the unpaired spectrum 504, a single frequency band 518 carries DL control (e.g., DL CTL 520), DL data (e.g., DL DATA 522), UL data (e.g., PUSCH 524), and UL control (e.g., UL CTL 526).

As mentioned above, a slot may be defined as including a specified number of symbols. To facilitate dynamic allocation of a slot (e.g., the symbols in a slot), a slot format scheme may be used to designate that certain symbols are to be used for UL communication and that certain symbols are to be used for DL communication. For example, to provide a desired level of UL and/or DL communication performance, a base station may designate a given symbol as being a DL symbol, a UL symbol, or a flexible symbol (e.g., a symbol that can be used for either UL or DL). In some examples, a base station may designate symbols in a slot according to a designated set of slot formats.

FIG. 6 illustrate an example of a slot format table 600 that defines a set of slot formats. Here, a given slot format (e.g., format 0, format 1, etc.), provides the designation for each symbol of a slot (for an example where a slot includes 14 symbols). For example, format 0 specifies that all of the symbols in the slot are DL symbols, format 1 specifies that all of the symbols in the slot are UL symbols, and format 2 specifies that all of the symbols in the slot are flexible symbols. Various combinations of DL symbols, UL symbols, and flexible symbols are indicated by the other formats as shown in the table 600.

A base station may use a slot format indicator (SFI) to designate which format is to be used for a particular slot or a set of slots. In addition, a UE may maintain a local copy of the same slot format table (e.g., the slot format table 600) used by the base station. Thus, the base station may send a format number to the UE to inform the UE of the selected format. In some examples, the base station may send the SFI in a dynamic manner (e.g., via a DCI) or in a static or semi-static manner (e.g., via RRC signaling).

Figure 7:
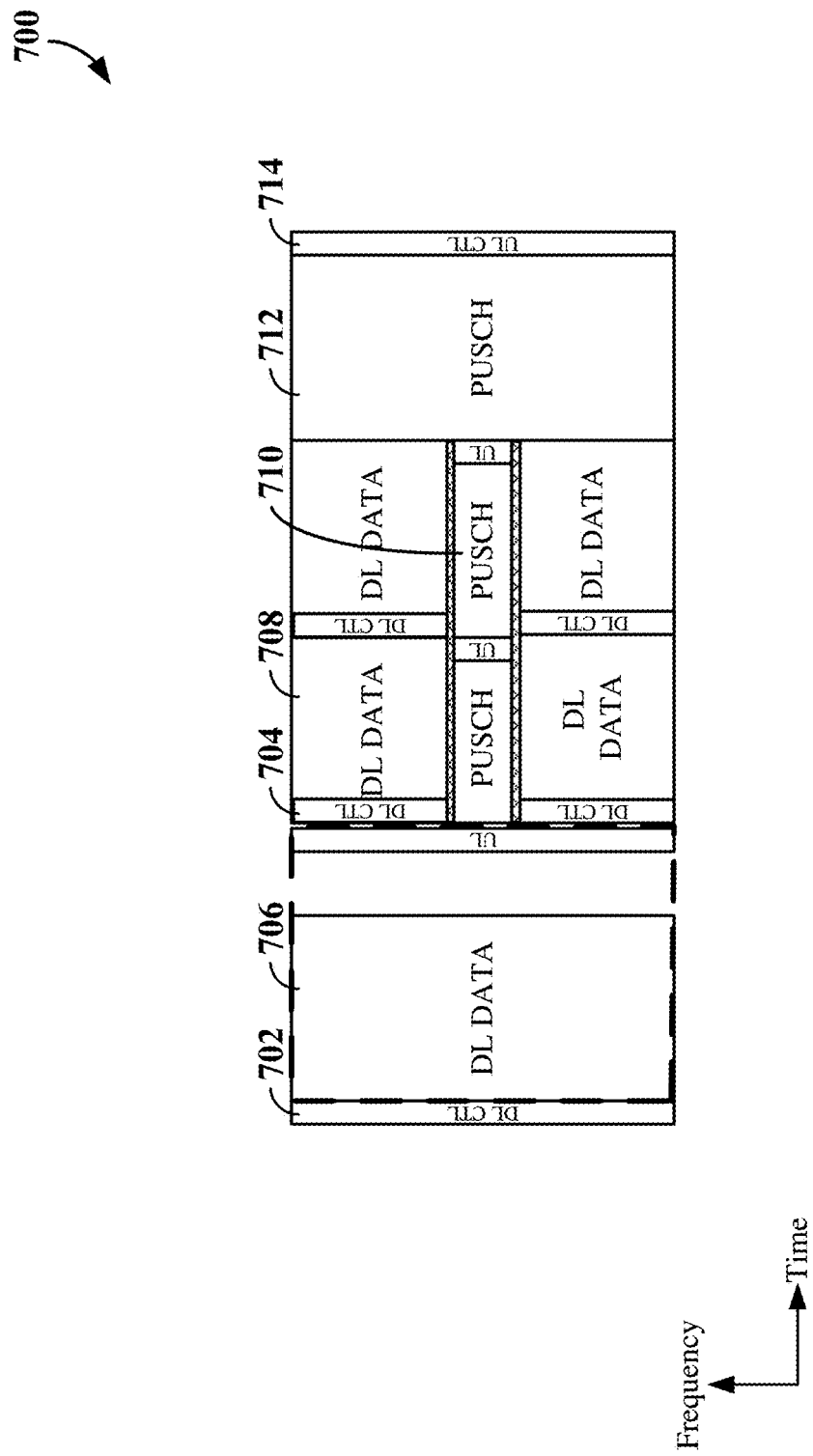
FIG. 7 is a diagram of an example of time slots for unpaired spectrum according to some aspects.

The disclosure relates in some aspects to FD (e.g., FDD) communication in an unpaired spectrum. For example, FIG. 7 illustrates an example of slots for an unpaired spectrum 700 (e.g., an unpaired RF band) that has been defined to support FDD and TDD communication. Here, a single frequency band (e.g., a single carrier) carries DL control (e.g., DL CTL 702 and 704), DL data (e.g., DL DATA 706 and 708), UL data (e.g., PUSCH 710 and 712), and UL control (e.g., UL CTL 714).

For operation on a single carrier in unpaired spectrum, the following options may be applied to support changes in the configuration of a symbol according to 3GPP TS 38.213 V15.9.0 (2020-03), section 11.1. For example, option 1 and option 2 set forth below may be used to determine whether to receive or transmit on a symbol that has been changes from UL and DL, or vice versa.

In option 1, for operation on a single carrier in unpaired spectrum, if a UE is configured by higher layers to receive a PDCCH, or a PDSCH, or a CSI-RS in a set of symbols of a slot, the UE will receive the PDCCH, the PDSCH, or the CSI-RS if the UE does not detect a DCI format 0_0, DCI format 0_1, DCI format 1_0, DCI format 1_1, or DCI format 2_3 that indicates to the UE to transmit a PUSCH, a PUCCH, a physical random access channel (PRACH), or an SRS in at least one symbol of the set of symbols of the slot. Otherwise, the UE does not receive the PDCCH, or the PDSCH, or the CSI-RS in the set of symbols of the slot.

In option 2, for operation on a single carrier in unpaired spectrum, if a UE is configured by higher layers to transmit SRS, or PUCCH, or PUSCH, or PRACH in a set of symbols of a slot and the UE detects a DCI format 1_0, DCI format 1_1, or DCI format 0_1 indicating to the UE to receive CSI-RS or PDSCH in a subset of symbols from the set of symbols, then the UE does not expect to cancel the transmission in symbols from the set of symbols that occur, relative to a last symbol of a CORESET where the UE detects the DCI format 1_0 or the DCI format 1_1 or the DCI format 0_1, after a number of symbols that is smaller than the PUSCH preparation time T_(proc,2). Where the PUSCH preparation time is for the corresponding UE processing capability assuming a parameter d_2,1=1 and a parameter pi corresponds to the smallest sub-carrier spacing (SCS) configuration between the SCS configuration of the PDCCH carrying the DCI format 1_0, DCI format 1_1 or DCI format 0_1 and the SCS configuration of the SRS, PUCCH, PUSCH or μ_r. Here, the parameter μ_r corresponds to the SCS configuration of the PRACH if it is 15 kHz or higher; otherwise μ_r=0. The UE cancels the PUCCH, or PUSCH, or PRACH transmission in the remaining symbols from the set of symbols and cancels the SRS transmission in the remaining symbols from the subset of symbols.

The disclosure relates in some aspects to managing a scheduled communication (e.g., determining whether to conduct the scheduled communication) in the event a BWP for the scheduled communication is changed in some way after the initial scheduling of the BWP. In some examples, for a UE indicating the capability (e.g., via a capability message) of operating in FD (e.g., FDD) mode on a single carrier in unpaired spectrum, a configured DL reception (e.g., PDCCH, or PDSCH, or CSI-RS) is not expected to be received in a given slot when the UE is indicated (e.g., by a received DCI or SFI) that the DL BWP in at least one symbol from a set of symbols where the UE is configured for the DL reception in the slot is different from the DL BWP that is configured for the DL reception. In some examples, the DL reception may be configured by higher layer signaling (e.g., RRC signaling as opposed to DCI signaling).

The indication received by the UE indicative of a change in a BWP may take different forms in different examples. In some examples, the indication is a DCI that indicates a change of an active UL BWP to transmit a PUSCH, a PUCCH, a PRACH, or an SRS in at least one symbol of the set of symbols of the slot. In this case, a change of the UL BWP may impose change of the active DL BWP in such a symbol (or symbols). In some examples, the indication is a DCI that explicitly indicates a change of an active DL BWP. In some examples, the indication is an SFI (a dynamic and/or RRC-based SFI) that indicates a change of a DL BWP in at least one symbol of the set of symbols of the slot.

In some examples, a configured DL reception is dropped only when a change of the active DL BWP in at least one symbol of the set of symbols of the slot impacts the DL reception. For example, a DL reception of an SPS PDSCH is not dropped if the whole SPS PDSCH fits within the new DL BWP.

In some examples, the priority of a communication (e.g., a channel) may be a factor that is used to determine whether to drop or maintain a communication (e.g., on one or more channels). For example, an error case may be designated for a scenario where a UE is subsequently scheduled with a low priority dynamic PUSCH that results in a change of the DL BWP size for the originally scheduled downlink transmission. As another example, an error case may be designated for a scenario where a UE is subsequently scheduled with a low priority dynamic PUSCH that results in dropping a high priority DL SPS PDSCH that was originally scheduled.

In some examples, the techniques described above for a UE configured for a DL reception may be similarly applied for a UE configured for a UL transmission with FDD in unpaired spectrum. In some examples, for a UE indicating the capability of operating in FD (e.g., FDD) on a single carrier in unpaired spectrum, if the UE is configured by higher layers (e.g., by higher layer signaling such as RRC signaling) to transmit an SRS, or PUCCH, or PUSCH, or PRACH in a set of symbols of a slot and the UE detects a DCI format indicating to the UE to receive CSI-RS or PDSCH in a subset of symbols from the set of symbols and the DCI indicates UL and/or DL BWP switching, then a delta Δ, (e.g., $\Delta = T_{proc,2}$) may be added to the delay required for DL (and/or UL) active BWP switching.

The parameter $T_{proc,2}$ represents the PUSCH preparation time as given, for example, by 3GPP TS 38.214 V15.9.0 (2020-03), section 6.4. In some aspects, the parameter $T_{proc,2}$ represents the time in which the UE does not expect to cancel a transmission in symbols from the set of symbols that occur, relative to the last symbol of a CORESET where the UE detects the scheduling DCI.

Figure 8:
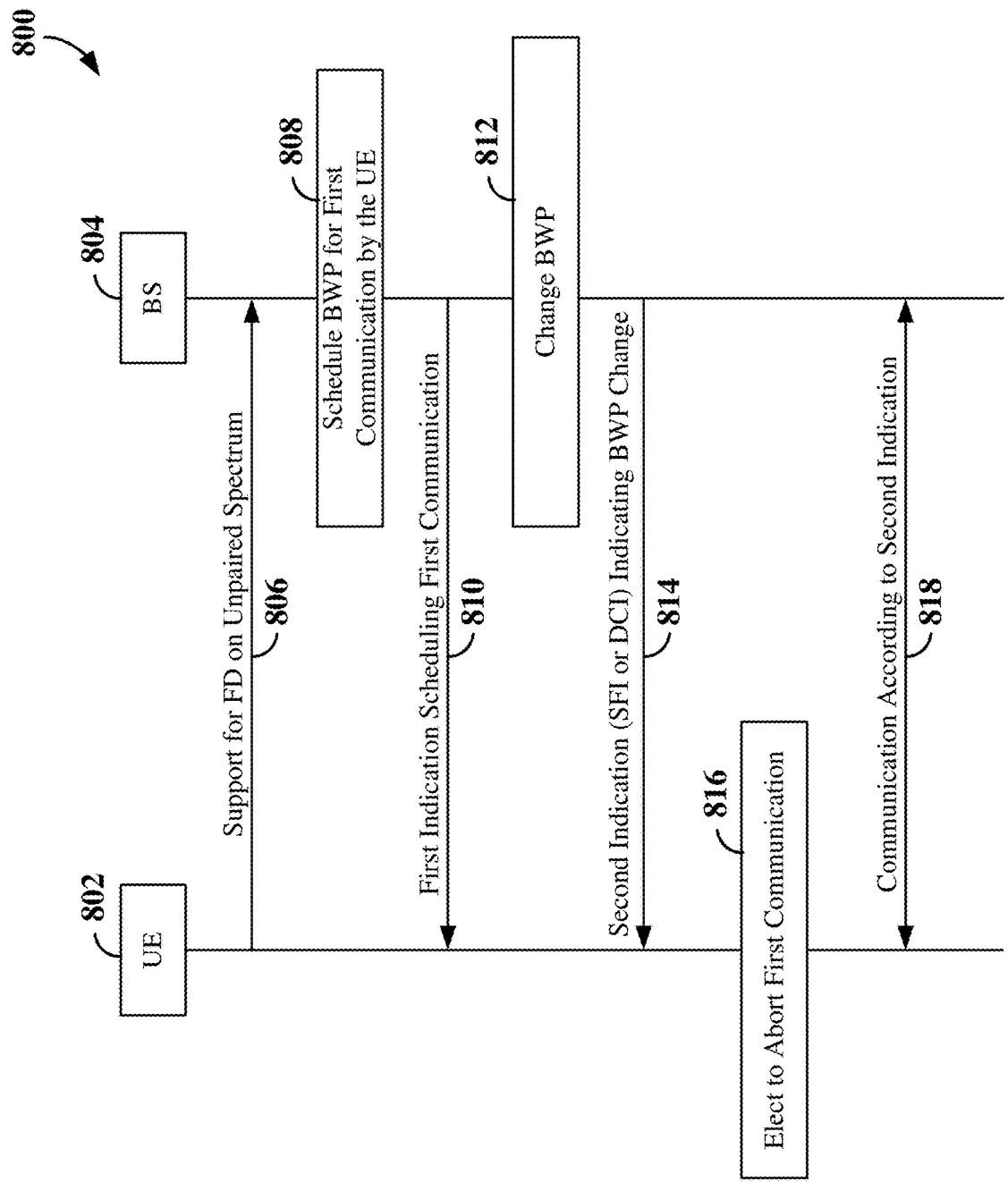
FIG. 8 is a signaling diagram illustrating an example of an indicated change in a BWP according to some aspects.
Figure 9:
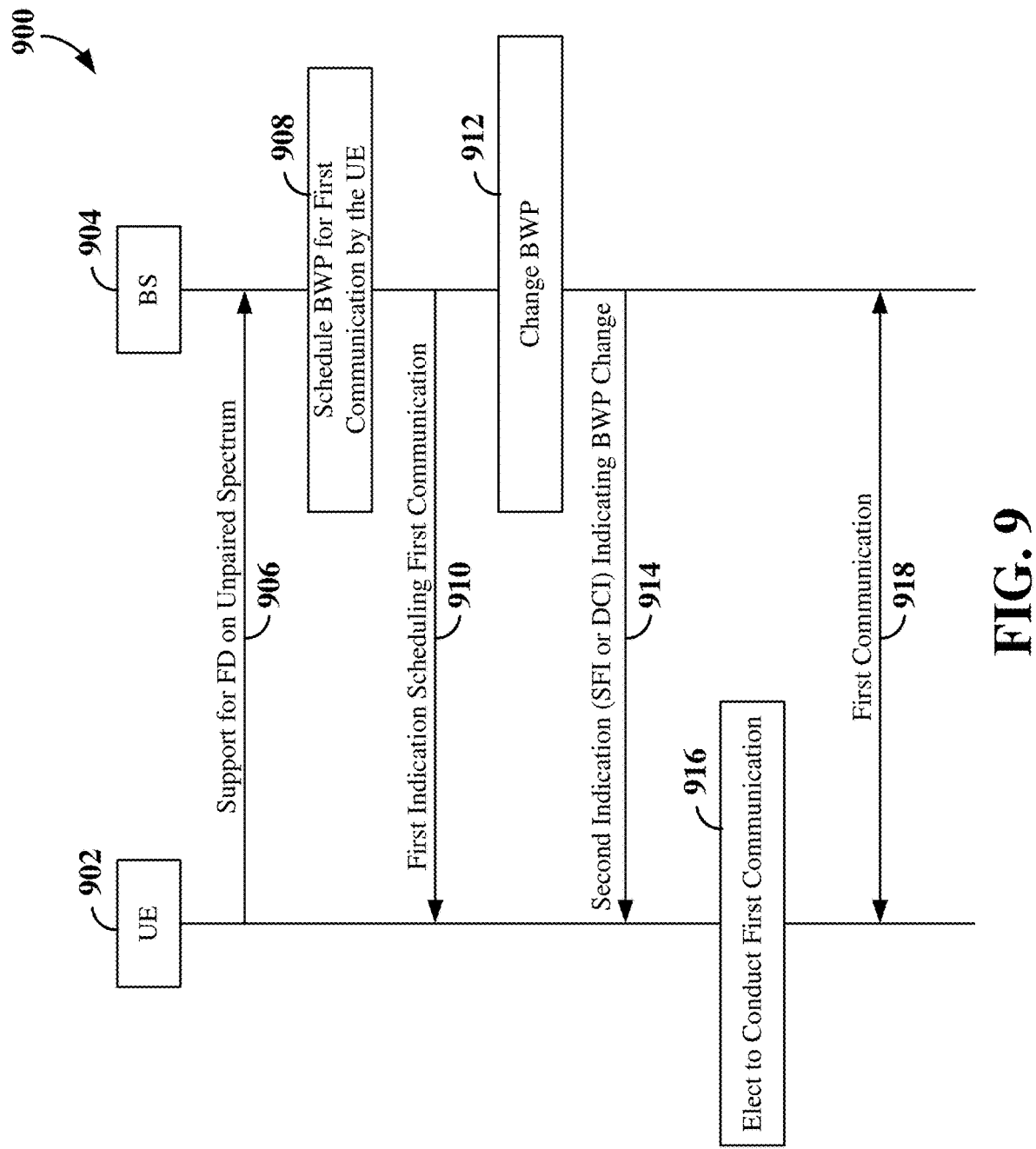
FIG. 9 is a signaling diagram illustrating another example of an indicated change in a BWP according to some aspects.

With the above in mind, FIGS. 8 and 9 illustrate examples of signaling between a UE and a base station and associated operations for handling a change in a BWP. FIG. 8 illustrates an example where the UE aborts a scheduled first communication due to the change in the BWP. FIG. 9 illustrates an example where the UE is able to perform at least some of the scheduled first communication despite the change in the BWP. Thus, in some aspects, FIGS. 8 and 9 illustrate different examples of selectively communicating information as a result of the change in the BWP.

FIG. 8 is a diagram illustrating an example of signaling 800 for scheduling a communication, and in some examples changing resource assignments, in a wireless communication network including a user equipment (UE) 802 and a base station (BS) 804. In some examples, the UE 802 may correspond to any of the UEs or scheduled entities shown in any of FIGS. 1, 2, 9, and 10. In some examples, the BS 804 may correspond to any of the base stations or scheduling entities shown in any of FIGS. 1, 2, 9, and 14.

At 806 of FIG. 8, the UE 802 transmits an indication to the BS 804 that indicates that the UE 802 is capable of operating in FD (e.g., FDD) mode on a single carrier in unpaired spectrum. For example, the UE 802 may include such an indication in a capability message.

At 808, the BS 804 schedules a first communication (e.g., a downlink (DL) reception or an uplink (UL) transmission) for the UE 802. Here, a scheduled DL reception may be associated with an active DL BWP. Similarly, a scheduled UL transmission may be associated with an active UL BWP.

At 810, the BS 804 sends a first indication (e.g., an RRC message or other suitable signaling) to the UE 802 including scheduling information for the first communication. For example, the scheduling information may indicate a set of symbols within a slot that the UE 802 is to use for the first communication. In some examples, the first communication is semi-statically configured (e.g., not dynamically scheduled by a DCI) by the BS 804. In some examples, the first communication is a higher-layer configured DL reception (e.g., SPS-PDSCH, CSI-RS, or PDCCH). In some examples, the first communication is a higher-layer configured UL transmission (CG-PUSCH, SRS, or PUCCH).

At 812, the BS 804 elects to change at least one aspect of the BWP for the first communication. As one example, the BS 804 may need to schedule higher priority traffic on at least one symbol of the set of symbols that was previously scheduled for the first communication. As another example, the BS 804 may elect to change the traffic on at least one symbol of the set of symbols that was previously scheduled for the first communication for interference purposes (e.g., to reduce interference to another device or to mitigate interference from another device).

As discussed above, in some examples, a decision by the BS 804 to reschedule the UE 802 may be based on the priority of the respective communications. For example, if the priority of the first communication is higher than the priority of a subsequent candidate communication, the BS 804 may elect to not schedule the subsequent communication.

In some examples, the BS 804 may schedule the UE 802 for an UL transmission (e.g., that has higher priority than a DL reception scheduled at 808) by the UE 802. In this case, the BS 804 may schedule at least one symbol of the set of symbols previously scheduled at 808 for the UL transmission (e.g., by generating a DCI indicating this scheduling). Thus, one or more symbols of the DL BWP for the first communication will now be designated for UL transmission instead of DL reception.

In some examples, the BS 804 may schedule the UE 802 for a DL reception (e.g., that has higher priority than an UL transmission scheduled at 808) by the UE 802. In this case, the BS 804 may schedule at least one symbol of the set of symbols previously scheduled at 808 for the DL reception (e.g., by generating a DCI indicating this scheduling). Thus, one or more symbols of the UL BWP for the first communication will now be designated for DL reception instead of UL transmission.

In some examples, the BS 804 may change the BWP associated with the first transmission. For example, the BS 804 may change the size of the BWP and/or reallocate one or more symbols of the BWP (e.g., to enable other higher priority scheduling and/or to reduce interference) and generate a DCI indicating this change/reallocation. Consequently, one or more symbols of a DL BWP for the first communication may no longer be allocated for the DL reception or one or more symbols of an UL BWP for the first communication may no longer be allocated for the UL transmission.

In some examples, the BS 804 may change a slot format. For example, the BS 804 may change a symbol that was previously specified as an UL symbol to a DL symbol or vice versa (e.g., for scheduling or interference purposes). In this case, the BS 804 may select an SFI indicative of the change in the slot format. Consequently, one or more symbols of a DL BWP for the first communication may no longer be a designated DL symbol or one or more symbols of an UL BWP for the first communication may no longer be a designated UL symbol.

At 814, the BS 804 sends a second indication (e.g., an SFI or a DCI) that is indicative of the BWP change from 812 to the UE 802. As discussed herein, the DCI may indicate, for example, a new scheduled communication for the UE 802, a change in the BWP for the first communication, or a change in another BWP.

At 816, the UE 802 elects to abort the first communication as a result of the BWP change. For example, if at least one symbol of a set of symbols previously scheduled for the first communication is no longer available for the first communication, the UE 802 may elect to abort the first communication. As discussed above, the unavailability of a symbol may be due to the UE being rescheduled (e.g., from a DL reception to an UL transmission or vice versa), due to the BWP being explicitly changed (e.g., reduced in size), due to the scheduling of another BWP that impacts the BWP (e.g., a change in an UL BWP that impact a DL BWP) such as an increase in the size of the other BWP, or due to a change in a direction specified for a symbol as indicated, for example, by an SFI.

As one example, if at least one symbol of a set of symbols previously scheduled for a DL reception is now scheduled for an UL transmission (or is no longer scheduled for the UE 802 or has been re-designated as an UL symbol), the UE 802 may elect to abort the DL reception. In this case, the UE 802 would not send an acknowledgement (e.g., a positive acknowledgement, ACK, or a negative acknowledgement, NAK) to the BS 804 regarding the first transmission in some examples.

As another example, if at least one symbol of a set of symbols previously scheduled for an UL transmission is now scheduled for a DL reception (or is no longer scheduled for the UE 802 or has been re-designated as a DL symbol), the UE 802 may elect to abort the transmission. For example, if the UE 802 has not started the transmission process, the UE 802 would not start the transmission process in some examples (FIG. 9 discusses another scenario where a UE has started the transmission process).

At 818, since the first transmission has been aborted, the UE 802 and the BS 804 may communicate according to the second indication (e.g., using resources as specified by the SFI or the DCI of 814). For example, if the DCI schedules an UL transmission for the UE 802, the UE 802 may transmit information to the BS 804 via the designated symbols (e.g., at least some of which were previously scheduled for a DL reception by the UE 802). As another example, if the DCI schedules a DL reception for the UE 802, the UE 802 may receive information from the BS 804 via the designated symbols (e.g., at least some of which were previously scheduled for an UL transmission by the UE 802). As yet another example, a subsequent communication using symbols that were changed as indicated by an SFI may use the symbols in the newly designated manner (e.g., UL or DL).

FIG. 9 is a diagram illustrating an example of signaling 900 for scheduling a communication, and in some examples changing resource assignments, in a wireless communication network including a user equipment (UE) 902 and a base station (BS) 904. In some examples, the UE 902 may correspond to any of the UEs or scheduled entities shown in any of FIGS. 1, 2, 8, and 10. In some examples, the BS 904 may correspond to any of the base stations or scheduling entities shown in any of FIGS. 1, 2, 8, and 14.

At 906 of FIG. 9, the UE 902 transmits an indication to the BS 904 that specifies that the UE 902 is capable of operating in FDD mode on a single carrier in unpaired spectrum. The operations of 906 may be similar to the operations of 806 of FIG. 8.

At 908, the BS 904 schedules a first communication (e.g., a downlink (DL) reception or an uplink (UL) transmission) for the UE 902. The operations of 908 may be similar to the operations of 808 of FIG. 8.

At 910, the BS 904 sends a first indication (e.g., an RRC message or other suitable signaling) to the UE 902 including scheduling information for the first communication. The operations of 910 may be similar to the operations of 810 of FIG. 8.

At 912, the BS 904 elects to change at least one aspect of the BWP for the first communication. The operations of 912 may be similar to the operations of 812 of FIG. 8. In this case, however, the change to the BWP part may still enable the UE 902 to perform at least a portion of the first communication. In some examples, the change to the BWP might not affect the symbols that will be used for the first communication. In some examples, the UE 902 may have already started transmitting information (e.g., the first communication is an UL transmission for the UE 902).

At 914, the BS 904 sends a second indication (e.g., an SFI or a DCI) that is indicative of the BWP change to the UE 902. The operations of 914 may be similar to the operations of 814 of FIG. 8.

At 916, the UE 902 elects to conduct the first communication despite the BWP change. For example, if the symbols previously scheduled for the first communication are not affected by the BWP change, the UE 902 may elect to perform the first communication. Here, the UE may have been rescheduled (e.g., from a DL reception to an UL transmission or vice versa) on symbols other than the symbols used for the first transmission. As another example, an explicit change in the BWP (e.g., a reduction in size) might not have eliminated the symbols used for the first transmission. As yet another example, scheduling of another BWP that impacts the BWP (e.g., a change in an UL BWP that impacts a DL BWP) such as an increase in the size of the other BWP might not impact (e.g., deallocate) the symbols used for the first transmission. As a further example, a change in a direction specified for symbols as indicated, for example, by an SFI might not concern the symbols used for the first transmission.

In some examples, if the set of symbols previously scheduled for a DL reception are not scheduled for a new UL transmission, the UE 902 may conduct the DL reception. In this case, the UE 902 may send an acknowledgement (e.g., a positive acknowledgement, ACK, or a negative acknowledgement, NAK) to the BS 904 regarding the first transmission in some examples.

In some examples, if the set of symbols previously scheduled for an UL transmission are not scheduled for a DL reception, the UE 902 may elect to conduct the UL transmission.

A further example involves a scenario where at least one symbol of the set of symbols previously scheduled for an UL transmission is now scheduled for a DL reception. Here, if the UE 902 has started the transmission process, the UE 902 may elect to continue the transmission for a period of time (e.g., for a delay period based on $T_{proc,2}$ as discussed above).

At 918, the UE 902 and the BS 904 may communicate according to the scheduled first communication. For example, if the first DCI schedules an UL transmission for the UE 902, the UE 902 may transmit information to the BS 904 via the designated symbols (or at least a subset of the symbols during the delay period). As another example, if the first DCI schedules a DL reception for the UE 902, the UE 902 may receive information from the BS 904 via the designated symbols.

Figure 10:
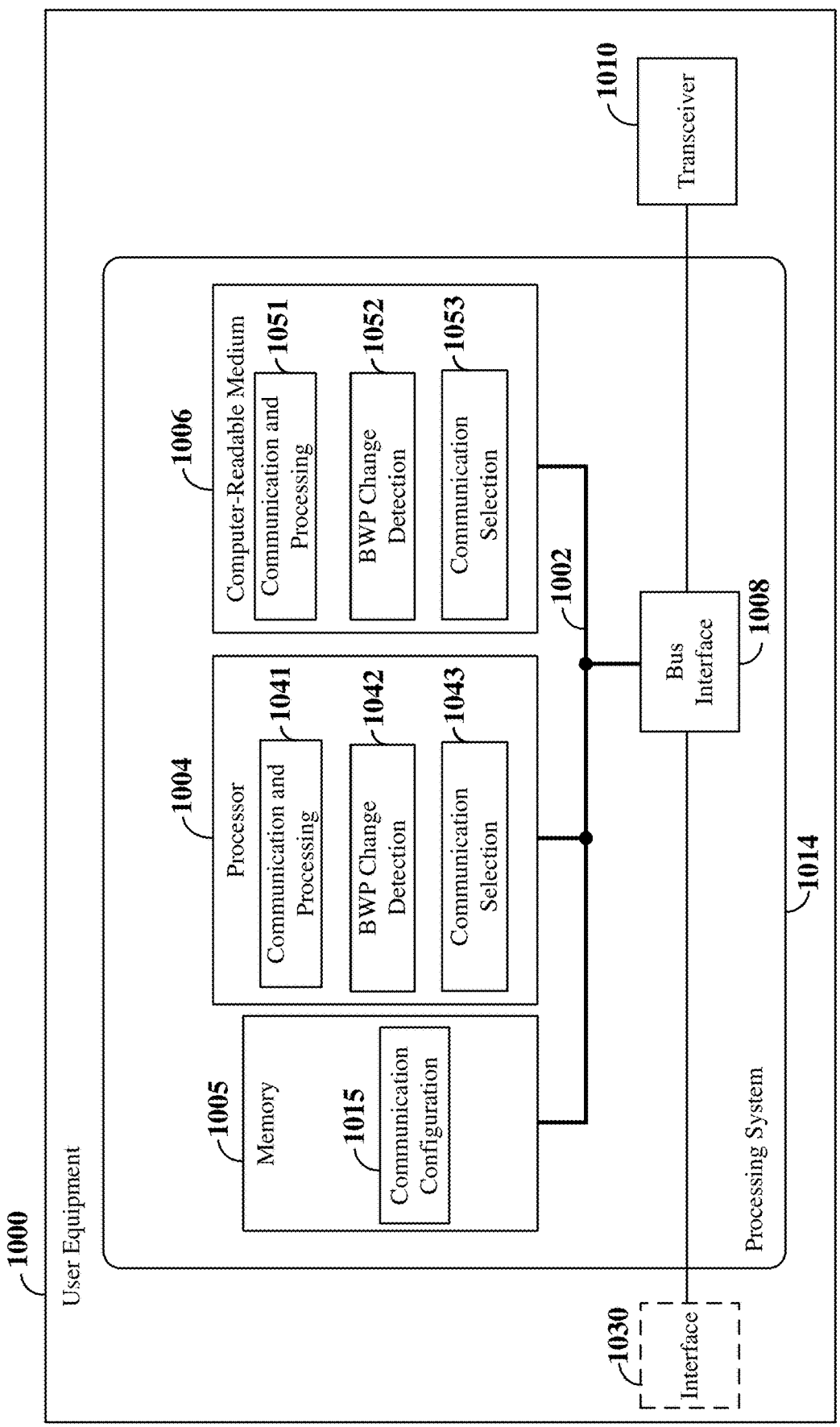
FIG. 10 is a block diagram conceptually illustrating an example of a hardware implementation for a user equipment employing a processing system according to some aspects.

FIG. 10 is a block diagram illustrating an example of a hardware implementation for a UE 1000 employing a processing system 1014. For example, the UE 1000 may be a device configured to wirelessly communicate with a base station, as discussed in any one or more of FIGS. 1-9. In some implementations, the UE 1000 may correspond to any of the UEs or scheduled entities shown in any of FIGS. 1, 2, 8, and 9.

In accordance with various aspects of the disclosure, an element, or any portion of an element, or any combination of elements may be implemented with the processing system 1014. The processing system 1014 may include one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes and procedures described herein.

The processor 1004 may in some instances be implemented via a baseband or modem chip and in other implementations, the processor 1004 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010 and between the bus 1002 and an interface 1030. The transceiver 1010 provides a communication interface or means for communicating with various other apparatus over a wireless transmission medium. The interface 1030 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1030 may include a user interface (e.g., keypad, display, speaker, microphone, joystick). Of course, such a user interface is optional, and may be omitted in some examples, such as an IoT device.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software. For example, the memory 1005 may store communication configuration information 1015 (e.g., BWP information) used by the processor 1004 for communication operations as described herein.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1000 may be configured to perform any one or more of the operations described herein (e.g., as described above in conjunction with FIGS. 1-9 and as described below in conjunction with FIGS. 11-13). In some aspects of the disclosure, the processor 1004, as utilized in the UE 1000, may include circuitry configured for various functions.

The processor 1004 may include communication and processing circuitry 1041. The communication and processing circuitry 1041 may be configured to communicate with a base station, such as a gNB. The communication and processing circuitry 1041 may include one or more hardware components that provide the physical structure that performs various processes related to wireless communication (e.g., signal reception and/or signal transmission) as described herein. The communication and processing circuitry 1041 may further include one or more hardware components that provide the physical structure that performs various processes related to signal processing (e.g., processing a received signal and/or processing a signal for transmission) as described herein. In some examples, the communication and processing circuitry 1041 may include two or more transmit/receive chains. The communication and processing circuitry 1041 may further be configured to execute communication and processing software 1051 included on the computer-readable medium 1006 to implement one or more functions described herein.

In some implementations where the communication involves receiving information, the communication and processing circuitry 1041 may obtain information from a component of the UE 1000 (e.g., from the transceiver 1010 that receives the information via radio frequency signaling or some other type of signaling suitable for the applicable communication medium), process (e.g., decode) the information, and output the processed information. For example, the communication and processing circuitry 1041 may output the information to another component of the processor 1004, to the memory 1005, or to the bus interface 1008. In some examples, the communication and processing circuitry 1041 may receive one or more of signals, messages, other information, or any combination thereof. In some examples, the communication and processing circuitry 1041 may receive information via one or more channels. In some examples, the communication and processing circuitry 1041 may include functionality for a means for receiving. In some examples, the communication and processing circuitry 1041 may include functionality for a means for decoding.

In some implementations where the communication involves sending (e.g., transmitting) information, the communication and processing circuitry 1041 may obtain information (e.g., from another component of the processor 1004, the memory 1005, or the bus interface 1008), process (e.g., encode) the information, and output the processed information. For example, the communication and processing circuitry 1041 may output the information to the transceiver 1010 (e.g., that transmits the information via radio frequency signaling or some other type of signaling suitable for the applicable communication medium). In some examples, the communication and processing circuitry 1041 may send one or more of signals, messages, other information, or any combination thereof. In some examples, the communication and processing circuitry 1041 may send information via one or more channels. In some examples, the communication and processing circuitry 1041 may include functionality for a means for sending (e.g., a means for transmitting). In some examples, the communication and processing circuitry 1041 may include functionality for a means for encoding.

In some examples, the communication and processing circuitry 1041 may include functionality for a means for transmitting an indication. For example, the communication and processing circuitry 1041 may transmit an indication to a BS via an uplink resource (e.g., PUCCH or PUSCH) that the BS scheduled for the UE 1000. In some examples, the communication and processing circuitry 1041 may transmit a capability message that includes the indication.

In some examples, the communication and processing circuitry 1041 may include functionality for a means for receiving an indication. For example, the communication and processing circuitry 1041 may receive an indication from a BS via a downlink resource (e.g., PDCCH or PDSCH) that the BS scheduled for the UE 1000. In some examples, the communication and processing circuitry 1041 may receive an RRC message or other higher layer signaling (e.g., by monitoring a specified resource and decoding signals detected on the resource) that schedules the UE 1000 to transmit or receive via a set of symbols. In some examples, the communication and processing circuitry 1041 may receive a DCI or an SFI (e.g., by monitoring a specified resource and decoding signals detected on the resource) that indicates a change of direction (e.g., from UL to DL or from DL to UL) for at least one symbol of the set of symbols.

The processor 1004 may include BWP change detection circuitry 1042 configured to perform BWP change detection-related operations as discussed herein. The BWP change detection circuitry 1042 may be configured to execute BWP change detection software 1052 included on the computer-readable medium 1006 to implement one or more functions described herein.

The BWP change detection circuitry 1042 may include functionality for a means for identifying a change to a BWP. In some examples, the BWP change detection circuitry 1042 may process a received indication (e.g., an SFI or DCI) to determine whether scheduling or a configuration indicated by the third indication impacts any of the symbols of a first BWP. This determination may involve, for example, determining whether a symbol of the first BWP has been rescheduled or reconfigured (e.g., from UL to DL or vice versa), or determining whether a change in a BWP affects previously scheduled symbols.

The processor 1004 may include communication selection circuitry 1043 configured to perform communication selection-related operations as discussed herein. The communication selection circuitry 1043 may further be configured to execute communication selection software 1053 included on the computer-readable medium 1006 to implement one or more functions described herein.

The communication selection circuitry 1043 may include functionality for a means for selectively communicating information. In some examples, the communication selection circuitry 1043 may determine whether a first communication or at least a portion of the first communication can take place in view of a change to a first BWP. Based on this determination, the communication selection circuitry 1043 may elect to transmit or receive the first information or abstain from transmitting or receiving the first information.

Figure 11:
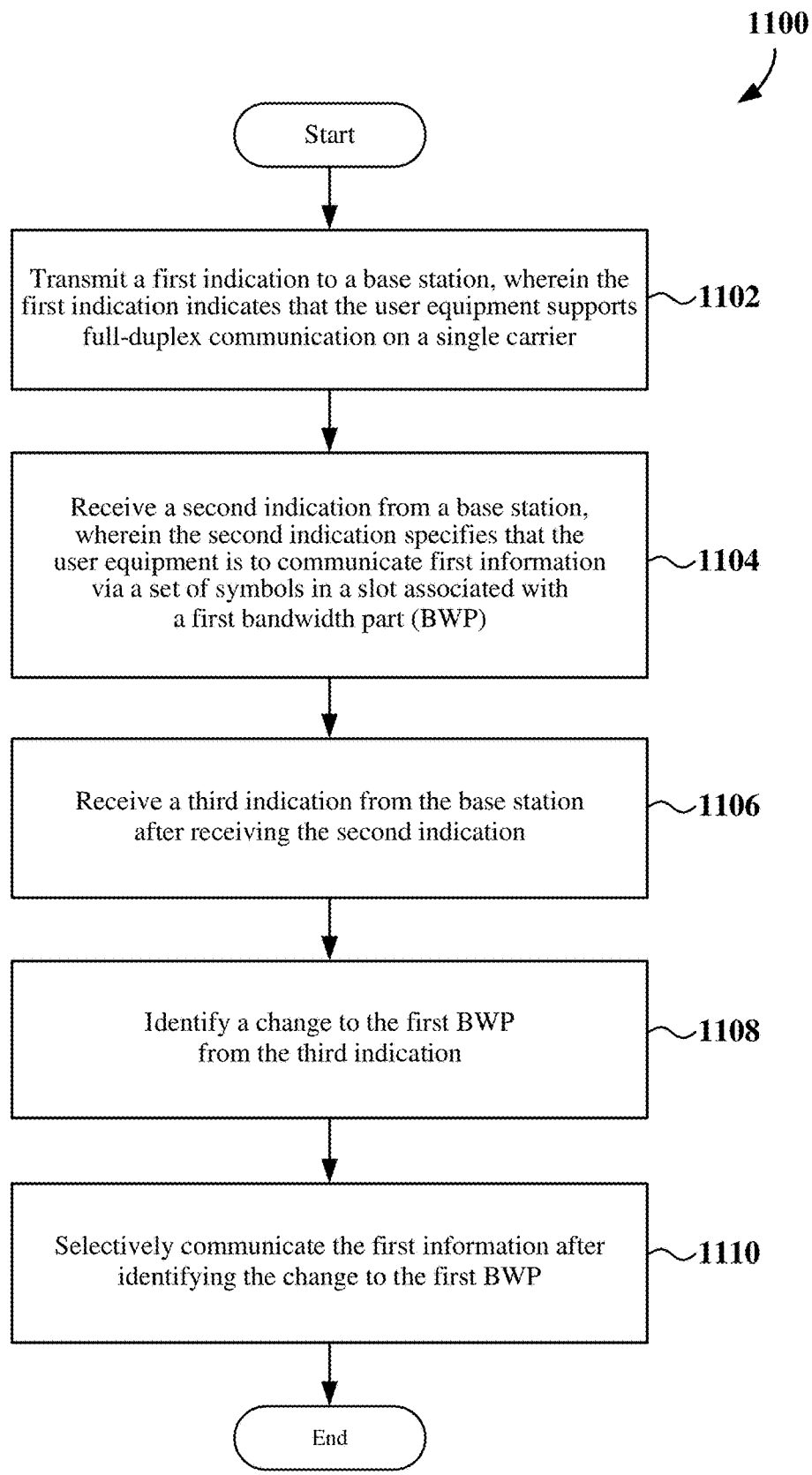
FIG. 11 is a flow chart illustrating an example process for selectively communicating information after identifying a BWP change according to some aspects.

FIG. 11 is a flow chart illustrating an example process 1100 for a wireless communication system in accordance with some aspects of the present disclosure. As described below, some or all illustrated features may be omitted in a particular implementation within the scope of the present disclosure, and some illustrated features may not be required for implementation of all examples. In some examples, the process 1100 may be carried out by the user equipment 1000 illustrated in FIG. 10. In some examples, the process 1100 may be carried out by any suitable apparatus or means for carrying out the functions or algorithm described below.

At block 1102, a user equipment may transmit a first indication to a base station (e.g., via a capability message). In some aspects, the first indication may indicate that the user equipment supports full-duplex communication on a single carrier (e.g., in an unpaired spectrum). In some examples, the communication and processing circuitry 1041 and the transceiver 1010, shown and described above in connection with FIG. 10 may provide a means to transmit a first indication to a base station.

At block 1104, the user equipment may receive a second indication from the base station (e.g., via an RRC message, a DCI, or some other signaling). In some aspects, the second indication may specify that the user equipment is to communicate first information via a set of symbols in a slot associated with a first bandwidth part (BWP). In some examples, the communication and processing circuitry 1041 and the transceiver 1010, shown and described above in connection with FIG. 10 may provide a means to receive a second indication from the base station.

In some examples, the second indication may schedule a downlink reception for a physical downlink control channel (PDCCH), a physical downlink shared channel (PDSCH), or a channel state information reference signal (CSI-RS). In some examples, the second indication may schedule an uplink transmission for a physical uplink control channel (PUCCH), a physical uplink shared channel (PUSCH), or a sounding reference signal (SRS).

At block 1106, the user equipment may receive a third indication from the base station after receiving the second indication. In some examples, the communication and processing circuitry 1041 and the transceiver 1010, shown and described above in connection with FIG. 10 may provide a means to receive a third indication from the base station.

In some examples, the receipt of the third indication by the user equipment may include receiving a radio resource control (RRC) message that includes a slot format indicator (SFI). In some examples, the receipt of the third indication by the user equipment may include receiving a DCI.

In some examples, the third indication may include a downlink control information (DCI) that indicates a change in a second BWP associated with at least one symbol of the set of symbols. In some examples, the change in the second BWP affects a communication direction scheduled for the first BWP for the at least one symbol. In some examples, the change in the second BWP affects a size of the first BWP.

In some examples, the first BWP may include a downlink BWP and the second BWP may include an uplink BWP. In some examples, the first BWP may specify that the set of symbols is scheduled for receiving the first information, and the second BWP may specify that the at least one symbol of the set of symbols is scheduled for transmitting second information.

In some examples, the first BWP may include an uplink BWP and the second BWP may include a downlink BWP. In some examples, the first BWP may specify that the set of symbols is scheduled for transmitting the first information, and the second BWP may specify that at least one symbol of the set of symbols is scheduled for receiving second information.

In some examples, the third indication may include a downlink control information (DCI) that indicates a change in the first BWP for at least one symbol of the set of symbols. In some examples, the third indication may include a downlink control information (DCI) that indicates that at least one symbol of the set of symbols scheduled for the first BWP for receiving the first information is scheduled for transmitting second information. In some examples, the third indication may include a downlink control information (DCI) that indicates that at least one symbol of the set of symbols scheduled for the first BWP for transmitting the first information is scheduled for receiving second information.

In some examples, the third indication may include a slot format indicator (SFI) that indicates a specific communication direction for at least one symbol of the set of symbols. In some examples, the third indication may include a slot format indicator (SFI) that indicates that at least one symbol of the set of symbols scheduled for the first BWP for receiving the first information is reserved for transmitting. In some examples, the third indication may include a slot format indicator (SFI) that indicates that at least one symbol of the set of symbols scheduled for the first BWP for transmitting the first information is reserved for receiving.

At block 1108, the user equipment may identify a change to the first BWP from the third indication. In some examples, the BWP change detection circuitry 1042 shown and described above in connection with FIG. 10 may provide a means to identify a change to the first BWP from the third indication.

At block 1110, the user equipment may selectively communicate the first information after identifying the change to the first BWP. In some examples, the communication selection circuitry 1043 shown and described above in connection with FIG. 10 may provide a means to selectively communicate the first information after identifying the change to the first BWP.

In some examples, the selectively communicating the first information by the user equipment may include electing to communicate the first information. In some examples, the user equipment may determine that the first information is to be communicated via at least one symbol of the set of symbols, determine that the change to the first BWP does not affect a communication direction for the at least one symbol, and communicate the first information via the at least one symbol after determining that the change to the first BWP does not affect the at least one symbol.

In some examples, the selectively communicating the first information by the user equipment may include electing to transmit the first information. In some examples, the user equipment may commence transmission of the first information via the set of symbols, and delay, for a period of time after commencing the transmission, a switch from the transmission of the first information to receiving second information via the set of symbols. In some examples, the period of time may be based on an uplink channel preparation time.

In some examples, the selectively communicating the first information by the user equipment may include electing to not communicate the information. In some examples, the user equipment may abstain from transmitting an acknowledgement for the first information to the base station. In some examples, the user equipment may abstain from transmitting the first information to the base station.

In some examples, the first information is assigned a first priority and the third indication may schedule a second communication assigned a second priority. In this case, the selectively communicating the first information by the user equipment may be based on whether the first priority is a higher priority than the second priority.

In some examples, the second indication may schedule a downlink reception for the user equipment that is assigned a first priority and the third indication may schedule an uplink transmission for the user equipment that is assigned a second priority. In this case, the selectively communicating the first information by the user equipment may include determining whether to receive the first information based on whether the first priority is a higher priority than the second priority.

In some examples, the second indication may schedule an uplink transmission for the user equipment that is assigned a first priority and the third indication may schedule a downlink reception for the user equipment that is assigned a second priority. In this case, the selectively communicating the first information by the user equipment may include determining whether to transmit the first information based on whether the first priority is a higher priority than the second priority.

Figure 12:
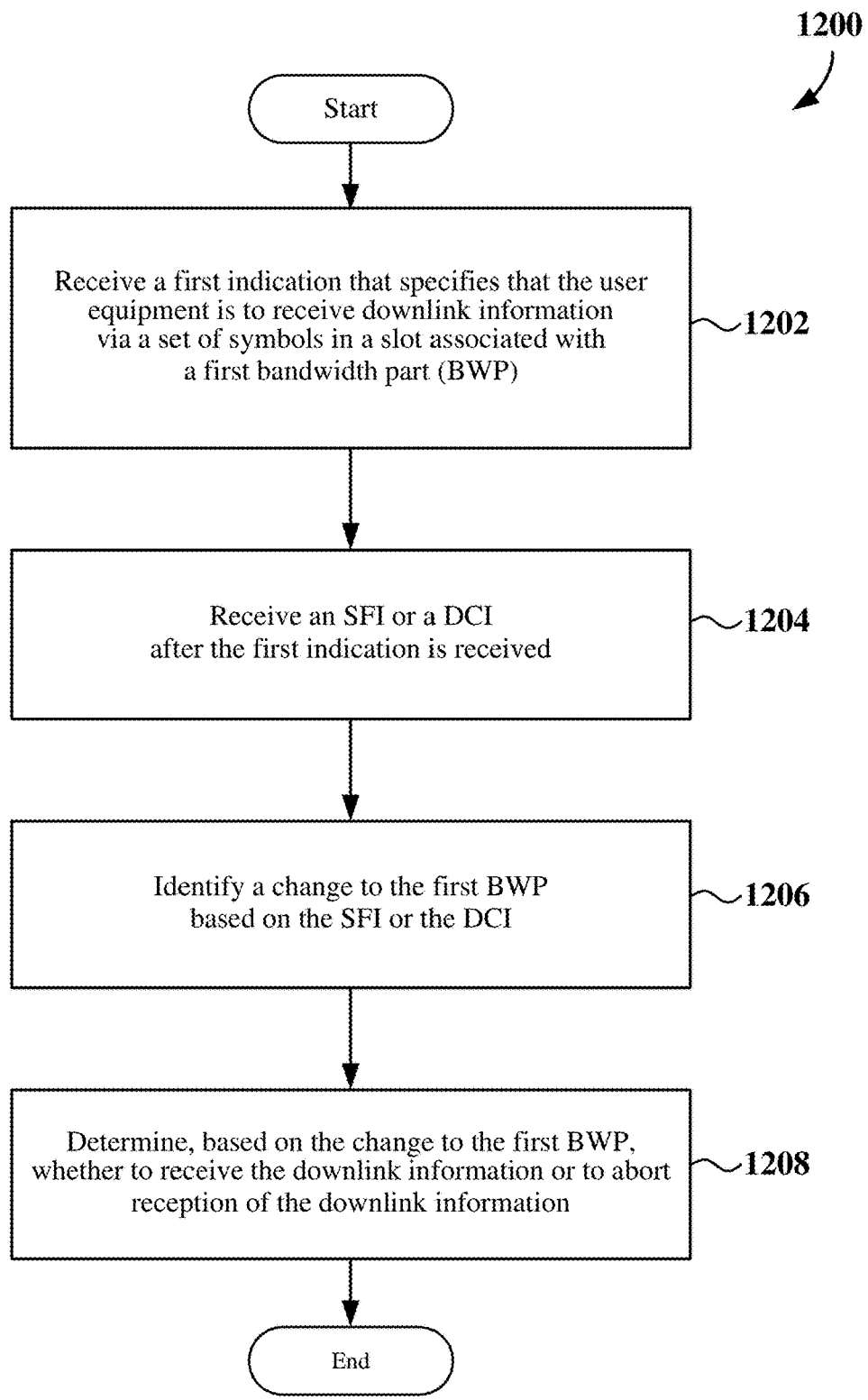
FIG. 12 is a flow chart illustrating an example process for determining whether to receive downlink information according to some aspects.

FIG. 12 is a flow chart illustrating an example process 1200 for a wireless communication system in accordance with some aspects of the present disclosure. In some aspects, the process 1200 may be an example of the process 1100. As described below, some or all illustrated features may be omitted in a particular implementation within the scope of the present disclosure, and some illustrated features may not be required for implementation of all examples. In some examples, the process 1200 may be carried out by the user equipment 1000 illustrated in FIG. 10. In some examples, the process 1200 may be carried out by any suitable apparatus or means for carrying out the functions or algorithm described below.

At block 1202, a user equipment may receive a first indication (e.g., via an RRC message, a DCI, or some other signaling) that specifies that the user equipment is to receive downlink information via a set of symbols in a slot associated with a first bandwidth part (BWP). In some aspects, the operations of block 1202 may be an example of the operations of block 1104 of FIG. 11. In some examples, the communication and processing circuitry 1041 and the transceiver 1010, shown and described above in connection with FIG. 10 may provide a means to receive a first indication that specifies that the user equipment is to receive downlink information via a set of symbols in a slot associated with a first bandwidth part (BWP).

At block 1204, the user equipment may receive an SFI or a DCI after the first indication is received. In some aspects, the operations of block 1204 may be an example of the operations of block 1106 of FIG. 11. In some examples, the communication and processing circuitry 1041 and the transceiver 1010, shown and described above in connection with FIG. 10 may provide a means to receive an SFI or a DCI after the first indication is received.

At block 1206, the user equipment may identify a change to the first BWP based on the SFI or the DCI received at block 1204. In some aspects, the operations of block 1206 may be an example of the operations of block 1108 of FIG. 11. In some examples, the BWP change detection circuitry 1042 shown and described above in connection with FIG. 10 may provide a means to identify a change to the first BWP based on the SFI or the DCI.

At block 1208, the user equipment may determine, based on the change to the first BWP, whether to receive the downlink information or to abort reception of the downlink information. In some aspects, the operations of block 1208 may be an example of the operations of block 1110 of FIG. 11. In some examples, the communication selection circuitry 1043 shown and described above in connection with FIG. 10 may provide a means to determine, based on the change to the first BWP, whether to receive the downlink information or to abort reception of the downlink information.

Figure 13:
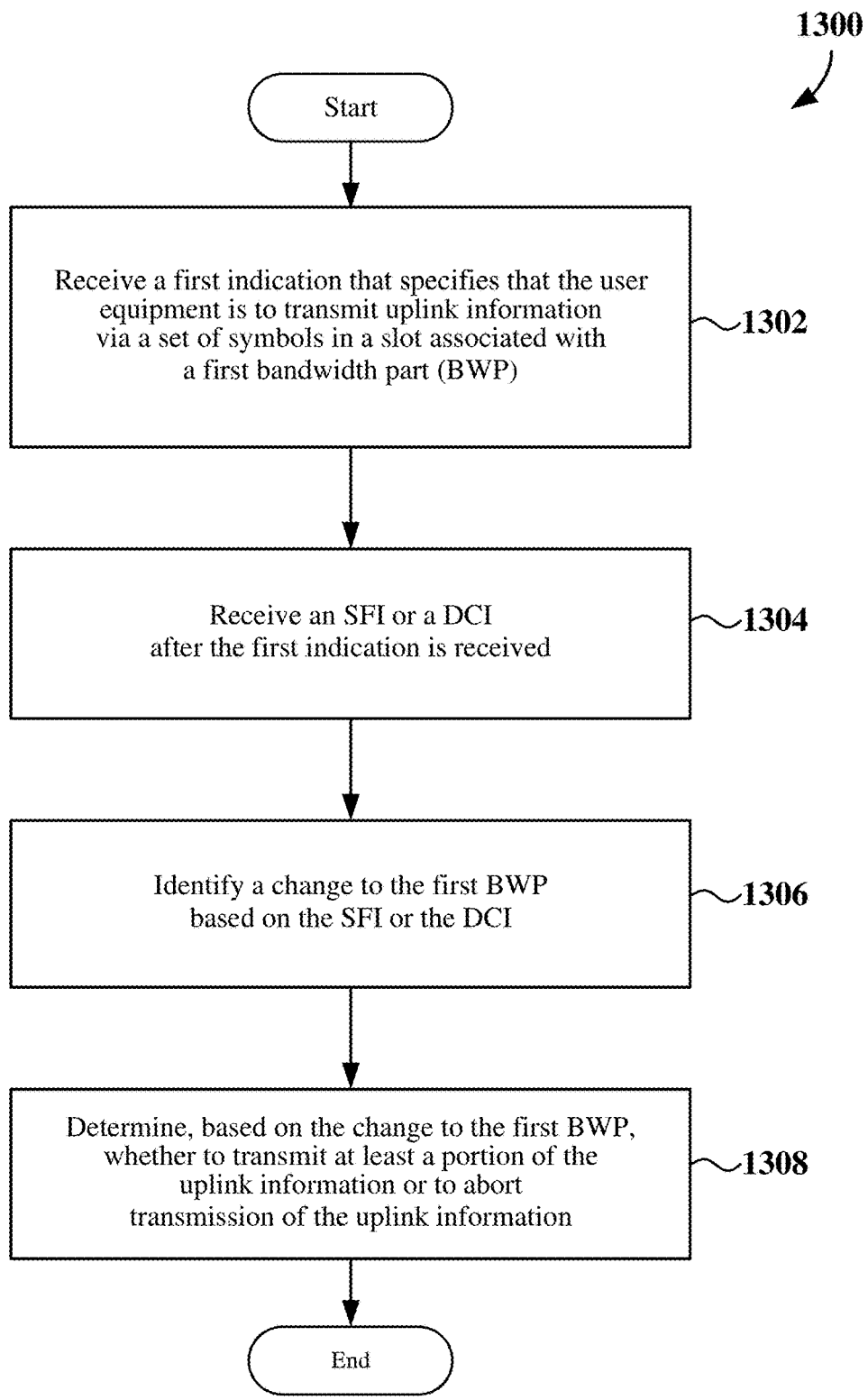
FIG. 13 is a flow chart illustrating an example process for determining whether to transmit uplink information according to some aspects.

FIG. 13 is a flow chart illustrating an example process 1300 for a wireless communication system in accordance with some aspects of the present disclosure. In some aspects, the process 1300 may be an example of the process 1100. As described below, some or all illustrated features may be omitted in a particular implementation within the scope of the present disclosure, and some illustrated features may not be required for implementation of all examples. In some examples, the process 1300 may be carried out by the user equipment 1000 illustrated in FIG. 10. In some examples, the process 1300 may be carried out by any suitable apparatus or means for carrying out the functions or algorithm described below.

At block 1302, a user equipment may receive first indication (e.g., via an RRC message, a DCI, or some other signaling) that specifies that the user equipment is to transmit uplink information via a set of symbols in a slot associated with a first bandwidth part (BWP). In some aspects, the operations of block 1302 may be an example of the operations of block 1104 of FIG. 11. In some examples, the communication and processing circuitry 1041 and the transceiver 1010, shown and described above in connection with FIG. 10 may provide a means to receive first indication that specifies that the user equipment is to transmit uplink information via a set of symbols in a slot associated with a first bandwidth part (BWP).

At block 1304, the user equipment may receive an SFI or a DCI after the first DCI is received. In some aspects, the operations of block 1304 may be an example of the operations of block 1106 of FIG. 11. In some examples, the communication and processing circuitry 1041 and the transceiver 1010, shown and described above in connection with FIG. 10 may provide a means to receive an SFI or a DCI after the first DCI is received.

At block 1306, the user equipment may identify a change to the first BWP based on the SFI or the DCI received at block 1304. In some aspects, the operations of block 1306 may be an example of the operations of block 1108 of FIG. 11. In some examples, the BWP change detection circuitry 1042 shown and described above in connection with FIG. 10 may provide a means to identify a change to the first BWP based on the SFI or the DCI.

At block 1308, the user equipment may determine, based on the change to the first BWP, whether to transmit at least a portion of the uplink information or to abort transmission of the uplink information. In some aspects, the operations of block 1308 may be an example of the operations of block 1110 of FIG. 11. In some examples, the communication selection circuitry 1043 shown and described above in connection with FIG. 10 may provide a means to determine, based on the change to the first BWP, whether to transmit at least a portion of the uplink information or to abort transmission of the uplink information.

In one configuration, the user equipment 1000 includes means for transmitting a first indication to a base station, wherein the first indication indicates that the user equipment supports full-duplex communication on a single carrier, means for receiving a second indication from the base station, wherein the second indication specifies that the user equipment is to communicate first information via a set of symbols in a slot associated with a first bandwidth part (BWP), means for receiving a third indication from the base station after receiving the second indication, means for identifying a change to the first BWP from the third indication, and means for selectively communicating the first information after identifying the change to the first BWP. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable medium 1006, or any other suitable apparatus or means described in any one or more of FIGS. 1, 2, 8, 9, and 10, and utilizing, for example, the processes and/or algorithms described herein in relation to FIGS. 11-13.

Figure 14:
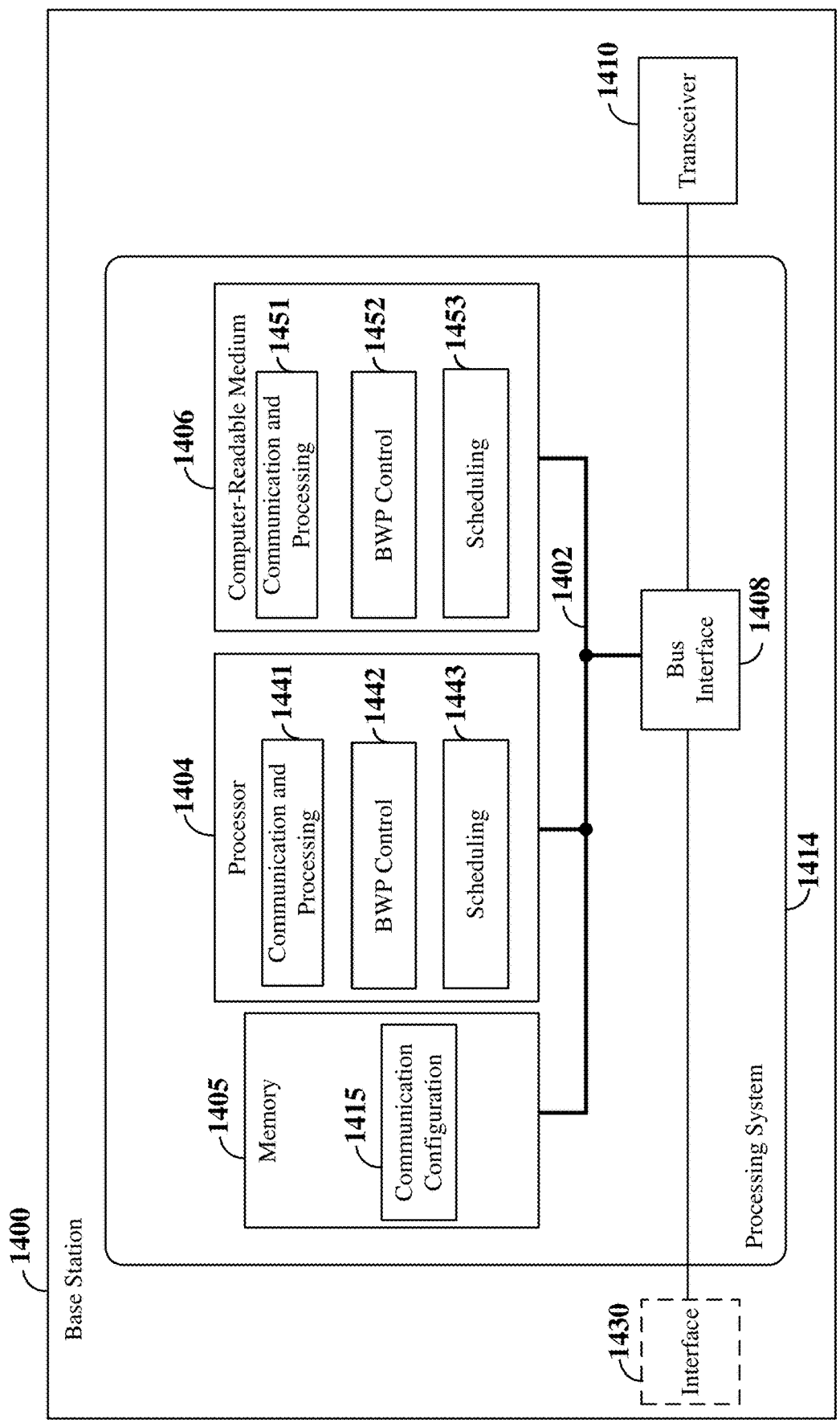
FIG. 14 is a block diagram conceptually illustrating an example of a hardware implementation for a base station employing a processing system according to some aspects.

FIG. 14 is a conceptual diagram illustrating an example of a hardware implementation for base station (BS) 1400 employing a processing system 1414. In some implementations, the BS 1400 may correspond to any of the BSs (e.g., gNBs) or scheduling entities shown in any of FIGS. 1, 2, 8, and 9.

In accordance with various aspects of the disclosure, an element, or any portion of an element, or any combination of elements may be implemented with the processing system 1414. The processing system may include one or more processors 1404. The processing system 1414 may be substantially the same as the processing system 1014 illustrated in FIG. 10, including a bus interface 1408, a bus 1402, memory 1405, a processor 1404, and a computer-readable medium 1406. The memory 1405 may store communication configuration information 1415 (e.g., BWP information) used by the processor 1404 for communication operations as discussed herein. Furthermore, the BS 1400 may include an interface 1430 (e.g., a network interface) that provides a means for communicating with at least one other apparatus within a core network and with at least one radio access network.

The BS 1400 may be configured to perform any one or more of the operations described herein (e.g., as described above in conjunction with FIGS. 1-9 and as described below in conjunction with FIGS. 15-17). In some aspects of the disclosure, the processor 1404, as utilized in the BS 1400, may include circuitry configured for various functions.

The processor 1404 may be configured to generate, schedule, and modify a resource assignment or grant of time-frequency resources (e.g., a set of one or more resource elements). For example, the processor 1404 may schedule time-frequency resources within a plurality of time division duplex (TDD) and/or frequency division duplex (FDD) subframes, slots, and/or mini-slots to carry user data traffic and/or control information to and/or from multiple UEs. The processor 1404 may be configured to schedule resources for the transmission of downlink signals and/or resources for the transmission of uplink signals.

In some aspects of the disclosure, the processor 1404 may include communication and processing circuitry 1441. The communication and processing circuitry 1444 may be configured to communicate with a UE. The communication and processing circuitry 1441 may include one or more hardware components that provide the physical structure that performs various processes related to communication (e.g., signal reception and/or signal transmission) as described herein. The communication and processing circuitry 1441 may further include one or more hardware components that provide the physical structure that performs various processes related to signal processing (e.g., processing a received signal and/or processing a signal for transmission) as described herein. The communication and processing circuitry 1441 may further be configured to execute communication and processing software 1451 included on the computer-readable medium 1406 to implement one or more functions described herein.

The communication and processing circuitry 1441 may further be configured to transmit a message to a UE and/or receive a message from a UE. For example, a downlink message be included in a MAC-CE carried in a PDSCH, a DCI carried in a PDCCH or PDSCH, or an RRC message. In addition, an uplink message be included in a MAC-CE carried in a PUSCH, UCI carried in a PUCCH, a random access message, or an RRC message.

In some implementations wherein the communication involves receiving information, the communication and processing circuitry 1441 may obtain information from a component of the BS 1400 (e.g., from the transceiver 1410 that receives the information via radio frequency signaling or some other type of signaling suitable for the applicable communication medium), process (e.g., decode) the information, and output the processed information. For example, the communication and processing circuitry 1441 may output the information to another component of the processor 1404, to the memory 1405, or to the bus interface 1408. In some examples, the communication and processing circuitry 1441 may receive one or more of signals, messages, other information, or any combination thereof. In some examples, the communication and processing circuitry 1441 may receive information via one or more channels. In some examples, the communication and processing circuitry 1441 may include functionality for a means for receiving. In some examples, the communication and processing circuitry 1441 may include functionality for a means for decoding.

In some implementations wherein the communication involves sending (e.g., transmitting) information, the communication and processing circuitry 1441 may obtain information (e.g., from another component of the processor 1404, the memory 1405, or the bus interface 1408), process (e.g., encode) the information, and output the processed information. For example, the communication and processing circuitry 1441 may output the information to the transceiver 1410 (e.g., that transmits the information via radio frequency signaling or some other type of signaling suitable for the applicable communication medium). In some examples, the communication and processing circuitry 1441 may send one or more of signals, messages, other information, or any combination thereof. In some examples, the communication and processing circuitry 1441 may send information via one or more channels. In some examples, the communication and processing circuitry 1441 may include functionality for a means for sending (e.g., a means for transmitting). In some examples, the communication and processing circuitry 1441 may include functionality for a means for encoding.

The communication and processing circuitry 1441 may include functionality for a means for transmitting an indication. For example, the communication and processing circuitry 1441 may transmit an indication to a UE via a downlink resource (e.g., PDCCH or PDSCH) that the BS 1400 scheduled for the UE. In some examples, the communication and processing circuitry 1441 may transmit an RRC message or other higher layer signaling (e.g., by encoding signals and transmitting the encoded signal on a specified resource) that schedules a UE to transmit or receive via a set of symbols. In some examples, the communication and processing circuitry 1441 may transmit a DCI or an SFI (e.g., by encoding signals and transmitting the encoded signal on a specified resource) that indicates a change of direction (e.g., from UL to DL or from DL to UL) for at least one symbol of the set of symbols.

The communication and processing circuitry 1441 may include functionality for a means for receiving an indication. For example, the communication and processing circuitry 1441 may receive an indication from a UE via an uplink resource (e.g., PUCCH or PUSCH) that the BS 1400 scheduled for the UE. In some examples, the communication and processing circuitry 1041 may receive a capability message that includes the indication.

The communication and processing circuitry 1441 may include functionality for a means for communicating with a user equipment. In some examples, the communication and processing circuitry 1441 may, according to scheduling for the user equipment, selectively send information (e.g., first information or other information) to the user equipment or receive information (e.g., first information or other information) from the user equipment.

The processor 1404 may include BWP control circuitry 1442 configured to perform BWP control-related operations as discussed herein. The BWP control circuitry 1442 may be configured to execute BWP control software 1452 included on the computer-readable medium 1406 to implement one or more functions described herein.

The BWP control circuitry 1442 may include functionality for a means for generating an indication of a change to a BWP. In some examples, the BWP control circuitry 1442 may determine a slot format change (e.g., make a slot format change or receive an indication of a slot format change) and generate an SFI indicative of a change to a previous slot format. In some examples, the BWP control circuitry 1442 may be configured to invoke a transmission of the indication of a change to a BWP (e.g., by retrieving information from memory, encoding the information, and causing the encoded information to be transmitted over-the-air).

The processor 1404 may include scheduling circuitry 1443 configured to perform scheduling-related operations as discussed herein. The scheduling circuitry 1443 may be configured to execute scheduling software 1453 included on the computer-readable medium 1406 to implement one or more functions described herein.

The scheduling circuitry 1443 may include functionality for a means for generating an indication that specifies that a user equipment is to communicate first information. In some examples, the scheduling circuitry 1443 may be configured to schedule a communication for the user equipment (e.g., a downlink reception or an uplink transmission) on a resource and generate an RRC message or other higher layer signaling that indicates that the user equipment is scheduled to transmit or receive via the set of symbols. In some examples, the scheduling circuitry 1443 may be configured to invoke a transmission of the RRC message or other signaling (e.g., by retrieving information from memory, encoding the information, and causing the encoded information to be transmitted over-the-air).

The scheduling circuitry 1443 may include functionality for a means for generating an indication of a change to a BWP. In some examples, the scheduling circuitry 1443 may schedule a communication for the user equipment on a resource and generate a DCI or other higher layer signaling that schedules the user equipment to transmit or receive via the set of symbols. In some examples, the scheduling circuitry 1443 may be configured to invoke a transmission of the indication of a change to a BWP (e.g., by retrieving information from memory, encoding the information, and causing the encoded information to be transmitted over-the-air).

Figure 15:
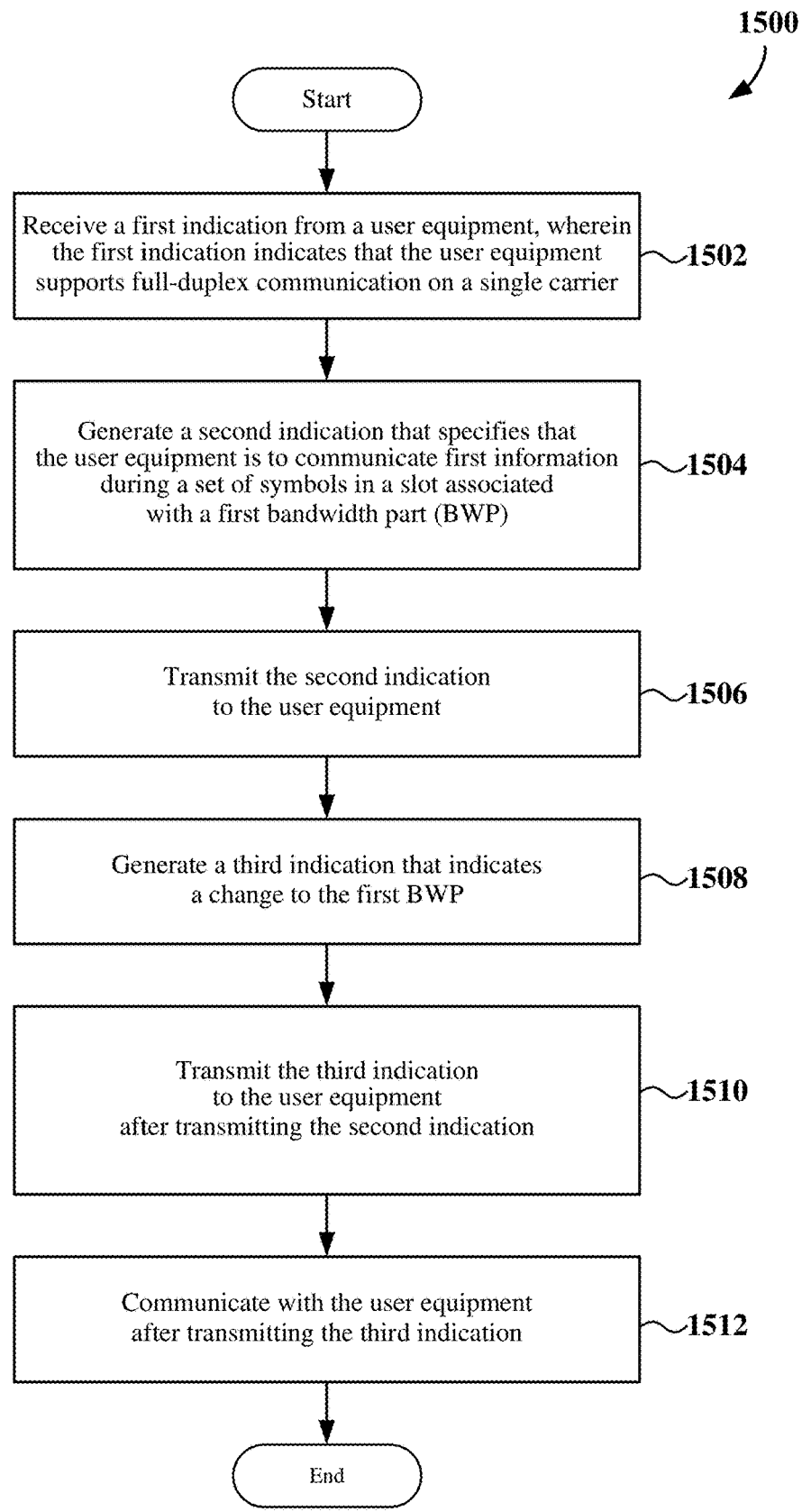
FIG. 15 is a flow chart illustrating an example process for selectively communicating information after indicating a BWP change according to some aspects.

FIG. 15 is a flow chart illustrating another example process 1500 for a wireless communication system in accordance with some aspects of the present disclosure. As described below, some or all illustrated features may be omitted in a particular implementation within the scope of the present disclosure, and some illustrated features may not be required for implementation of all examples. In some examples, the process 1500 may be carried out by the BS 1400 illustrated in FIG. 14. In some examples, the process 1500 may be carried out by any suitable apparatus or means for carrying out the functions or algorithm described below.

At block 1502, a base station may receive first indication from a user equipment (e.g., via a capability message or some other signaling). In some aspects, the first indication may indicate that the user equipment supports full-duplex communication on a single carrier (e.g., in an unpaired spectrum). In some examples, the communication and processing circuitry 1441 and the transceiver 14010, shown and described above in connection with FIG. 14 may provide a means to receive a first indication from a user equipment.

At block 1504, the base station may generate a second indication that specifies that the user equipment is to communicate first information during a set of symbols in a slot associated with a first bandwidth part (BWP). In some examples, the scheduling circuitry 1443 shown and described above in connection with FIG. 14 may provide a means to generate a second indication that specifies that the user equipment is to communicate first information during a set of symbols in a slot associated with a first bandwidth part (BWP).

In some examples, the second indication may schedule a downlink reception for a physical downlink control channel (PDCCH), a physical downlink shared channel (PDSCH), or a channel state information reference signal (CSI-RS). In some examples, the second indication may schedule an uplink transmission for a physical uplink control channel (PUCCH), a physical uplink shared channel (PUSCH), or a sounding reference signal (SRS).

At block 1506, the base station may transmit the second indication to the user equipment (e.g., via an RRC message, a DCI, or some other signaling). In some examples, the scheduling circuitry 1443 in cooperation with the communication and processing circuitry 1441 and the transceiver 1410, shown and described above in connection with FIG. 14, may provide a means to transmit the second indication to the user equipment.

At block 1508, the base station may generate a third indication that indicates a change to the first BWP. In some examples, the scheduling circuitry 1443 shown and described above in connection with FIG. 14 may schedule a communication for the user equipment on a resource and generate a DCI or other higher layer signaling that schedules the user equipment to transmit or receive via the set of symbols. As another example, the BWP control circuitry 1442 shown and described above in connection with FIG. 14 may provide a means to generate a third indication that indicates a change to the first BWP.

In some examples, the third indication may include a downlink control information (DCI) that indicates a change in a second BWP associated with at least one symbol of the set of symbols. In some examples, the change in the second BWP affects a communication direction scheduled for the first BWP for the at least one symbol. In some examples, the change in the second BWP affects a size of the first BWP.

In some examples, the third indication may include a downlink control information (DCI) that indicates a change in the first BWP for at least one symbol of the set of symbols. In some examples, the third indication may include a downlink control information (DCI) that indicates that at least one symbol of the set of symbols scheduled for the first BWP for receiving the first information is scheduled for transmitting the second information. In some examples, the third indication may include a downlink control information (DCI) that indicates that at least one symbol of the set of symbols scheduled for the first BWP for transmitting the first information is scheduled for receiving second information.

In some examples, the third indication may include a slot format indicator (SFI) that indicates a specific communication direction for at least one symbol of the set of symbols. In some examples, the third indication may include a slot format indicator (SFI) that indicates that at least one symbol of the set of symbols scheduled for the first BWP for receiving the first information is reserved for transmitting. In some examples, the third indication may include a slot format indicator (SFI) that indicates that at least one symbol of the set of symbols scheduled for the first BWP for transmitting the first information is reserved for receiving.

At block 1510, the base station may transmit the third indication to the user equipment after transmitting the second indication. In some examples, the scheduling circuitry 1443 in cooperation with the communication and processing circuitry 1441 and the transceiver 1410, shown and described above in connection with FIG. 14, may provide a means to transmit the third indication to the user equipment after transmitting the second indication.

In some examples, the transmission of the third indication by the base station may include transmitting a radio resource control (RRC) message that includes a slot format indicator (SFI). In some examples, the transmission of the third indication by the base station may include transmitting a DCI.

In some examples, the base station may receive a third indication that the user equipment supports frequency division duplexing on a single carrier in an unpaired spectrum. In this case, the transmission of the third indication by the base station may be conditioned on the receiving of the third indication. For example, in some implementations, the third indication might only be sent to the user equipment if the third indication has been received from the user equipment.

At block 1512, the base station may communicate with the user equipment after transmitting the third indication. In some examples, the communication and processing circuitry 1441 and the transceiver 1410, shown and described above in connection with FIG. 14, may provide a means to communicate with the user equipment after transmitting the third indication.

In some examples, the communication with the user equipment by the base station may include communicating the first information. In some examples, the first information is scheduled to be communicated via at least one symbol of the set of symbols, and the change to the first BWP does not affect a communication direction for the at least one symbol. In some examples, the communication of the first information by the base station may include commencing receiving the first information via the set of symbols, and delaying, for a period of time after commencing the receiving of the first information, a switch from receiving the first information to transmitting second information via the set of symbols. In some examples, the period of time may be based on an uplink channel preparation time.

In some examples, the communication with the user equipment by the base station may include communicating second information associated with the change to the first BWP.

In some examples, the first BWP may include a downlink BWP and the second BWP may include an uplink BWP. In some examples, the first BWP may specify that the set of symbols is scheduled for receiving the first information, and the second BWP may specify that at least one symbol of the set of symbols is scheduled for transmitting the second information.

In some examples, the first BWP may include an uplink BWP and the second BWP may include a downlink BWP. In some examples, the first BWP may specify that the set of symbols is scheduled for transmitting the first information, and the second BWP may specify that the at least one symbol of the set of symbols is scheduled for receiving the second information.

In some examples, the first information is assigned a first priority. In this case, the base station may determine that a second communication is assigned a second priority that is a higher priority than the first priority, and elect to send the third indication to schedule the second communication after determining that the second communication is assigned the second priority that is a higher priority than the first priority.

In some examples, the second indication may schedule a downlink reception for the user equipment that is assigned a first priority. In this case, the base station may determine that an uplink transmission is assigned a second priority that is a higher priority than the first priority, and elect to send the third indication to schedule the uplink transmission after determining that the uplink transmission is assigned the second priority that is a higher priority than the first priority.

In some examples, the second indication may schedule an uplink transmission for the user equipment that is assigned a first priority. In this case, the base station may determine that a downlink transmission is assigned a second priority that is a higher priority than the first priority, and elect to send the third indication to schedule the downlink transmission after determining that the downlink transmission is assigned the second priority that is a higher priority than the first priority.

Figure 16:
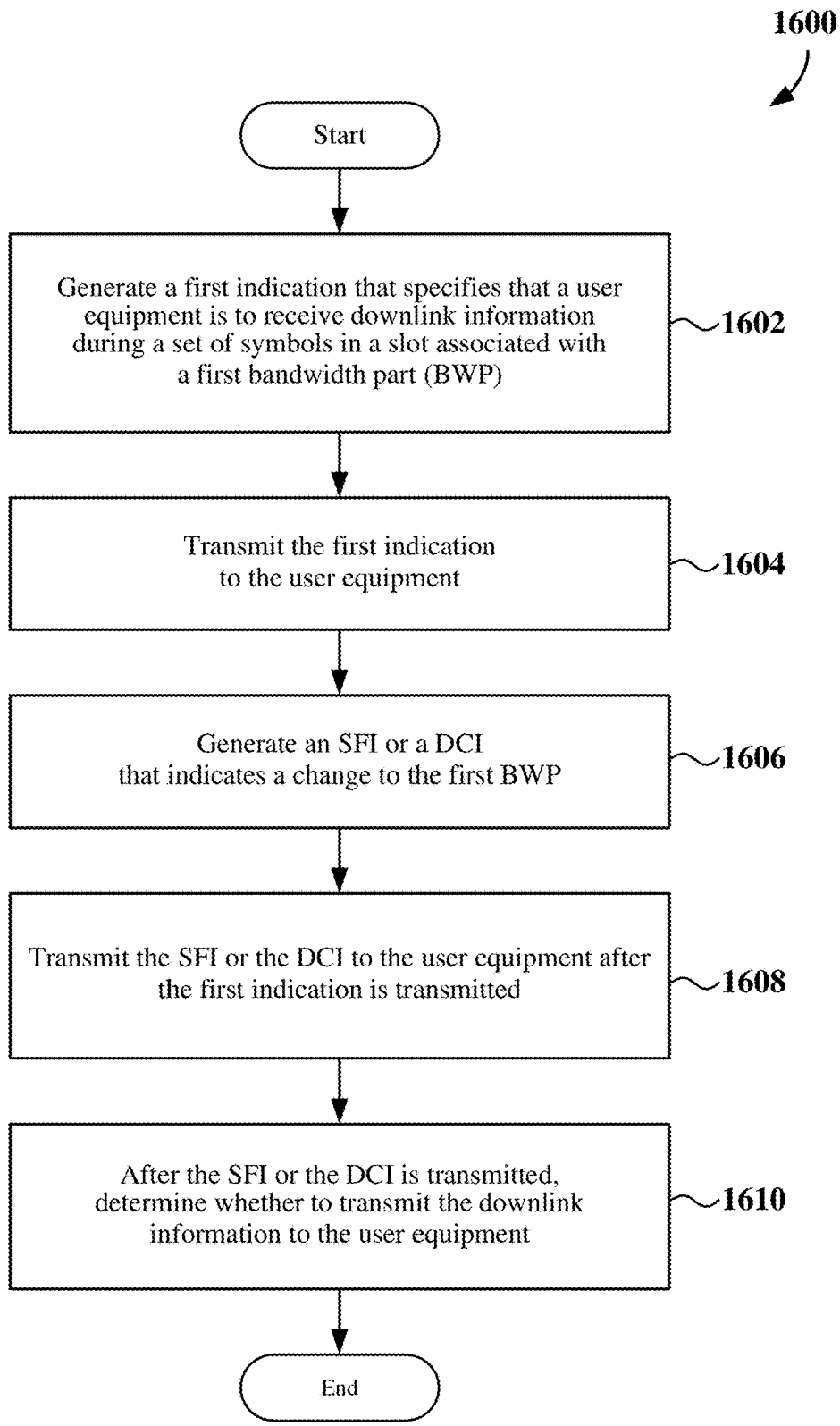
FIG. 16 is a flow chart illustrating an example process for determining whether to transmit downlink information according to some aspects.

FIG. 16 is a flow chart illustrating another example process 1600 for a wireless communication system in accordance with some aspects of the present disclosure. In some aspects, the process 1600 may be an example of the process 1500. As described below, some or all illustrated features may be omitted in a particular implementation within the scope of the present disclosure, and some illustrated features may not be required for implementation of all examples. In some examples, the process 1600 may be carried out by the BS 1400 illustrated in FIG. 14. In some examples, the process 1600 may be carried out by any suitable apparatus or means for carrying out the functions or algorithm described below.

At block 1602, a base station may generate a first indication that specifies that a user equipment is to receive downlink information during a set of symbols in a slot associated with a first bandwidth part (BWP). In some aspects, the operations of block 1602 may be an example of the operations of block 1504 of FIG. 15. In some examples, the scheduling circuitry 1443 shown and described above in connection with FIG. 14 may provide a means to generate a first indication that specifies that a user equipment is to receive downlink information during a set of symbols in a slot associated with a first bandwidth part (BWP).

At block 1604, the base station may transmit the first indication to the user equipment (e.g., via an RRC message, a DCI, or some other signaling). In some aspects, the operations of block 1604 may be an example of the operations of block 1506 of FIG. 15. In some examples, the scheduling circuitry 1443 in cooperation with the communication and processing circuitry 1441 and the transceiver 1410, shown and described above in connection with FIG. 14, may provide a means to transmit the first indication to the user equipment.

At block 1606, the base station may generate an SFI or a DCI that indicates a change to the first BWP. In some aspects, the operations of block 1606 may be an example of the operations of block 1508 of FIG. 15. In some examples, the scheduling circuitry 1443 shown and described above in connection with FIG. 14 may schedule a communication for the user equipment on a resource and generate a DCI or other higher layer signaling that schedules the user equipment to transmit or receive via the set of symbols. As another example, the BWP control circuitry 1442 shown and described above in connection with FIG. 14 may provide a means to generate an SFI or a DCI that indicates a change to the first BWP.

At block 1608, the base station may transmit the SFI or the DCI generated at block 1606 to the user equipment after the first indication is transmitted. In some aspects, the operations of block 1610 may be an example of the operations of block 1508 of FIG. 15. In some examples, the scheduling circuitry 1443 in cooperation with the communication and processing circuitry 1441 and the transceiver 1410, shown and described above in connection with FIG. 14, may provide a means to transmit the SFI or the DCI to the user equipment after the first indication is transmitted.

At block 1610, the base station may determine, after the SFI or the DCI is transmitted, whether to transmit the downlink information to the user equipment. In some aspects, the operations of block 1612 may be an example of the operations of block 1510 of FIG. 15. In some examples, the communication and processing circuitry 1441 and the transceiver 1410, shown and described above in connection with FIG. 14, may provide a means to determine, after the SFI or the DCI is transmitted, whether to transmit the downlink information to the user equipment.

Figure 17:
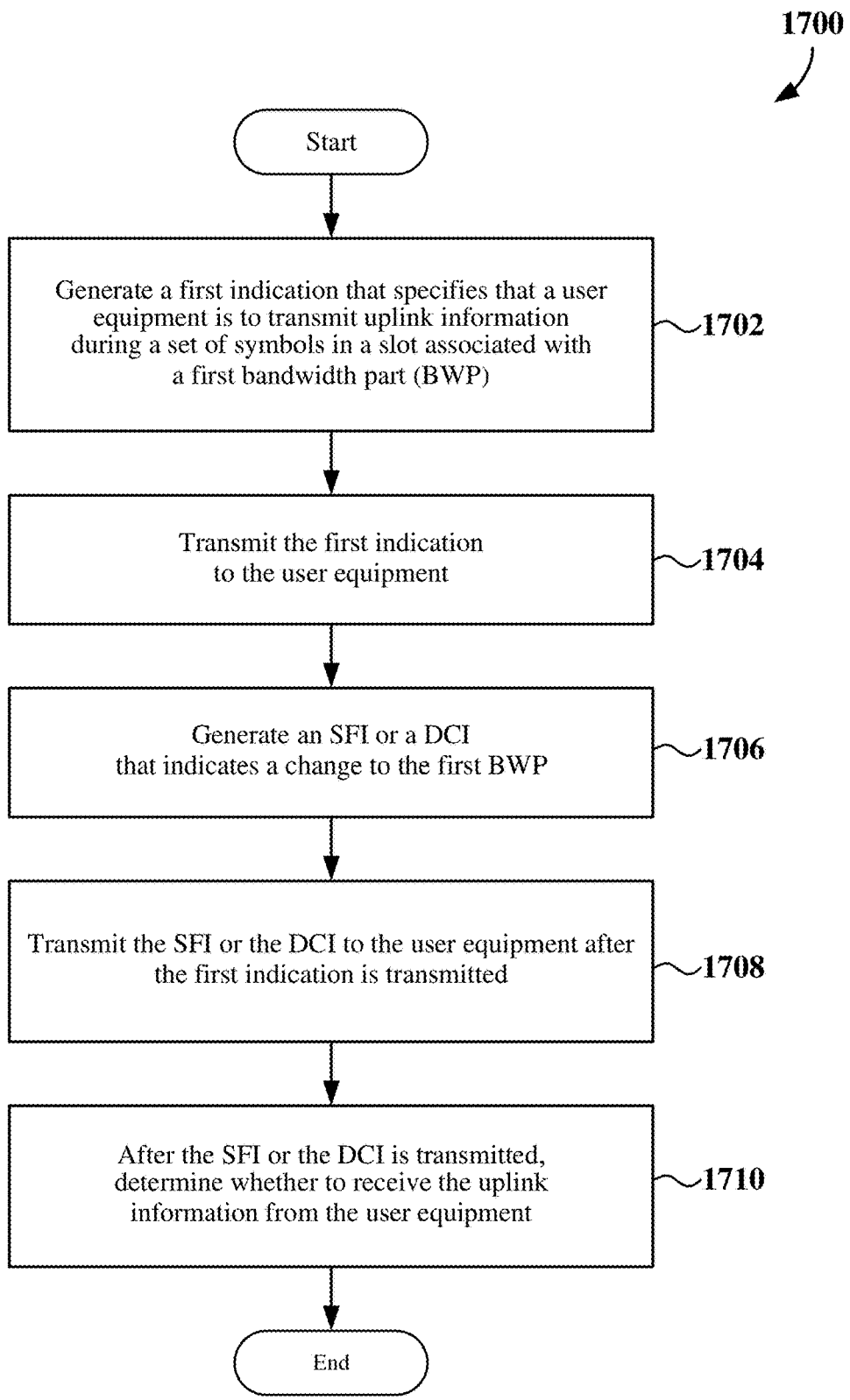
FIG. 17 is a flow chart illustrating an example process for determining whether to receive uplink information according to some aspects.

FIG. 17 is a flow chart illustrating another example process 1700 for a wireless communication system in accordance with some aspects of the present disclosure. In some aspects, the process 1700 may be an example of the process 1500. As described below, some or all illustrated features may be omitted in a particular implementation within the scope of the present disclosure, and some illustrated features may not be required for implementation of all examples. In some examples, the process 1700 may be carried out by the BS 1400 illustrated in FIG. 14. In some examples, the process 1700 may be carried out by any suitable apparatus or means for carrying out the functions or algorithm described below.

At block 1702, a base station may generate a first indication that specifies that a user equipment is to transmit uplink information during a set of symbols in a slot associated with a first bandwidth part (BWP). In some aspects, the operations of block 1702 may be an example of the operations of block 1504 of FIG. 15. In some examples, the scheduling circuitry 1443 shown and described above in connection with FIG. 14 may provide a means to generate a first indication that specifies that a user equipment is to transmit uplink information during a set of symbols in a slot associated with a first bandwidth part (BWP).

At block 1704, the base station may transmit the first indication to the user equipment (e.g., via an RRC message, a DCI, or some other signaling). In some aspects, the operations of block 1704 may be an example of the operations of block 1506 of FIG. 15. In some examples, the scheduling circuitry 1443 in cooperation with the communication and processing circuitry 1441 and the transceiver 1410, shown and described above in connection with FIG. 14, may provide a means to transmit the first indication to the user equipment.

At block 1706, the base station may generate an SFI or a DCI that indicates a change to the first BWP. In some aspects, the operations of block 1706 may be an example of the operations of block 1508 of FIG. 15. In some examples, the scheduling circuitry 1443 shown and described above in connection with FIG. 14 may provide a means to. In some examples, the BWP control circuitry 1442 shown and described above in connection with FIG. 14 may provide a means to generate an SFI or a DCI that indicates a change to the first BWP.

At block 1708, the base station may transmit the SFI or the DCI generated at block 1706 to the user equipment after the first indication is transmitted. In some aspects, the operations of block 1708 may be an example of the operations of block 1510 of FIG. 15. In some examples, the scheduling circuitry 1443 in cooperation with the communication and processing circuitry 1441 and the transceiver 1410, shown and described above in connection with FIG. 14, may provide a means to transmit the SFI or the DCI to the user equipment after the first indication is transmitted.

At block 1710, the base station may determine, after the SFI or the DCI is transmitted, whether to receive the uplink information from the user equipment. In some aspects, the operations of block 1710 may be an example of the operations of block 1512 of FIG. 15. In some examples, the communication and processing circuitry 1441 and the transceiver 1410, shown and described above in connection with FIG. 14, may provide a means to determine, after the SFI or the DCI is transmitted, whether to receive the uplink information from the user equipment.

In one configuration, the base station 1400 includes means for receiving a first indication from a user equipment, wherein the first indication indicates that the user equipment supports full-duplex communication on a single carrier, means for generating a second indication that specifies that the user equipment is to communicate first information during a set of symbols in a slot associated with a first bandwidth part (BWP), means for transmitting the second indication to the user equipment, means for generating a third indication that indicates a change to the first BWP, means for transmitting the third indication to the user equipment after transmitting the second indication, and means for communicating with the user equipment after transmitting the third indication. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable medium 1406, or any other suitable apparatus or means described in any one or more of FIGS. 1, 2, 8, 9, and 14, and utilizing, for example, the processes and/or algorithms described herein in relation to FIGS. 15-17.

The methods shown in FIGS. 11-13 and 15-17 may include additional aspects, such as any single aspect or any combination of aspects described below and/or in connection with one or more other processes described elsewhere herein. The following provides an overview of several aspects of the present disclosure.

Aspect 1: A method for wireless communication at a user equipment, the method comprising: transmitting a first indication to a base station, wherein the first indication indicates that the user equipment supports full-duplex communication on a single carrier; receiving a second indication from the base station, wherein the second indication specifies that the user equipment is to communicate first information via a set of symbols in a slot associated with a first bandwidth part (BWP); receiving a third indication from the base station after receiving the second indication; identifying a change to the first BWP from the third indication; and selectively communicating the first information after identifying the change to the first BWP.

Aspect 2: The method of aspect 1, wherein the selectively communicating the first information comprises electing to communicate the first information, the method further comprising: determining that the first information is to be communicated via at least one symbol of the set of symbols; determining that the change to the first BWP does not affect a communication direction for the at least one symbol; and communicating the first information via the at least one symbol after the determining that the change to the first BWP does not affect the at least one symbol.

Aspect 3: The method of aspect 1 or 2, wherein the selectively communicating the first information comprises electing to transmit the first information, the method further comprising: commencing transmission of the first information via the set of symbols; and delaying, for a period of time after commencing the transmission, a switch from the transmission of the first information to reception of second information via the set of symbols.

Aspect 4: The method of aspect 3, wherein the period of time is based on an uplink channel preparation time.

Aspect 5: The method of any of aspects 1 through 4, wherein the selectively communicating the first information comprises electing to not communicate the first information.

Aspect 6: The method of aspect 5, further comprising: abstaining from transmitting an acknowledgement for the first information to the base station; or abstaining from transmitting the first information to the base station.

Aspect 7: The method of any of aspects 1 through 6, wherein the third indication comprises a downlink control information (DCI) that indicates a change in a second BWP associated with at least one symbol of the set of symbols.

Aspect 8: The method of aspect 7, wherein: the change in the second BWP affects a communication direction scheduled for the first BWP for the at least one symbol; or the change in the second BWP affects a size of the first BWP.

Aspect 9: The method of any of aspects 7 through 8, wherein: the first BWP comprises a downlink BWP for receiving the first information; and the second BWP comprises an uplink BWP for transmitting second information.

Aspect 10: The method of any of aspects 7 through 8, wherein: the first BWP comprises an uplink BWP for transmitting the first information; and the second BWP comprises a downlink BWP for receiving second information.

Aspect 11: The method of any of aspects 1 through 10, wherein: the third indication comprises a downlink control information (DCI) that indicates the change to the first BWP for at least one symbol of the set of symbols.

Aspect 12: The method of any of aspects 1 through 11, wherein the third indication comprises a downlink control information (DCI) that indicates: that at least one symbol of the set of symbols scheduled for the first BWP for receiving the first information is scheduled for transmitting second information; or that at least one symbol of the set of symbols scheduled for the first BWP for transmitting the first information is scheduled for receiving second information.

Aspect 13: The method of any of aspects 1 through 12, wherein the third indication comprises a slot format indicator (SFI) that indicates: that at least one symbol of the set of symbols scheduled for the first BWP for receiving the first information is reserved for transmitting; or that at least one symbol of the set of symbols scheduled for the first BWP for transmitting the first information is reserved for receiving.

Aspect 14: The method of any of aspects 1 through 13, wherein: the first information is assigned a first priority; the third indication schedules a second communication assigned a second priority; and the selectively communicating the first information is based on whether the first priority is a higher priority than the second priority.

Aspect 15: The method of any of aspects 1 through 14, wherein: the second indication schedules a downlink reception for the user equipment that is assigned a first priority; the third indication schedules an uplink transmission for the user equipment that is assigned a second priority; and the selectively communicating the first information comprises selectively receiving the first information based on whether the first priority is a higher priority than the second priority.

Aspect 16: The method of any of aspects 1 through 15, wherein: the second indication schedules an uplink transmission for the user equipment that is assigned a first priority; the third indication schedules a downlink reception for the user equipment that is assigned a second priority; and the selectively communicating the first information comprises selectively transmitting the first information based on whether the first priority is a higher priority than the second priority.

Aspect 17: The method of any of aspects 1 through 16, wherein the second indication schedules: a downlink reception for a physical downlink control channel (PDCCH), a physical downlink shared channel (PDSCH), or a channel state information reference signal (CSI-RS); or an uplink transmission for a physical uplink control channel (PUCCH), a physical uplink shared channel (PUSCH), or a sounding reference signal (SRS).

Aspect 18: The method of any of aspects 1 through 17, wherein the first information comprises data for a semi-statically configured downlink reception or a semi-statically configured uplink transmission.

Aspect 20: A method for wireless communication at a base station, the method comprising: receiving a first indication from a user equipment, wherein the first indication indicates that the user equipment supports full-duplex communication on a single carrier; generating a second indication that specifies that the user equipment is to communicate first information during a set of symbols in a slot associated with a first bandwidth part (BWP); transmitting the second indication to the user equipment; generating a third indication that indicates a change to the first BWP; transmitting the third indication to the user equipment after transmitting the second indication; and communicating with the user equipment after transmitting the third indication.

Aspect 21: The method of aspect 20, wherein: the communicating with the user equipment comprises communicating the first information; the first information is scheduled to be communicated via at least one symbol of the set of symbols; and the change to the first BWP does not affect a communication direction for the at least one symbol.

Aspect 22: The method of any of aspects 20 through 21, wherein the communicating with the user equipment comprises: commencing receiving of the first information via the set of symbols; and delaying, for a period of time after commencing the receiving of the first information, a switch from the receiving of the first information to transmitting second information via the set of symbols.

Aspect 23: The method of any of aspects 20 through 22, wherein the communicating with the user equipment comprises communicating second information associated with the change to the first BWP.

Aspect 24: The method of aspect 23, wherein the third indication comprises a downlink control information (DCI) that indicates a change in a second BWP associated with at least one symbol of the set of symbols.

Aspect 25: The method of aspect 23, wherein the third indication comprises a downlink control information (DCI) that indicates a change in the first BWP for at least one symbol of the set of symbols.

Aspect 26: The method of any of aspects 20 through 25, wherein the first information is assigned a first priority, the method further comprising: determining that a second communication is assigned a second priority that is a higher priority than the first priority; and electing to send the third indication to schedule the second communication after determining that the second communication is assigned the second priority that is a higher priority than the first priority.

Aspect 27: The method of any of aspects 20 through 26, wherein the second indication schedules a downlink reception for the user equipment that is assigned a first priority, the method further comprising: determining that an uplink transmission is assigned a second priority that is a higher priority than the first priority; and electing to send the third indication to schedule the uplink transmission after determining that the uplink transmission is assigned the second priority that is a higher priority than the first priority.

Aspect 28: The method of any of aspects 20 through 27, wherein the second indication schedules an uplink transmission for the user equipment that is assigned a first priority, the method further comprising: determining that a downlink transmission is assigned a second priority that is a higher priority than the first priority; and electing to send the third indication to schedule the downlink transmission after determining that the downlink transmission is assigned the second priority that is a higher priority than the first priority.

Aspect 29: The method of any of aspects 20 through 28, wherein the transmitting of the second indication is conditioned on the receiving of the first indication indicating that the user equipment supports the full-duplex communication on the single carrier in an unpaired spectrum.

Aspect 30: A user equipment comprising: a transceiver configured to communicate with a radio access network, a memory, and a processor communicatively coupled to the transceiver and the memory, wherein the processor and the memory are configured to perform any one of aspects 1 through 18.

Aspect 31: An apparatus configured for wireless communication comprising at least one means for performing any one of aspects 1 through 18.

Aspect 32: A non-transitory computer-readable medium storing computer-executable code, comprising code for causing an apparatus to perform any one of aspects 1 through 18.

Aspect 33: A base station comprising: a transceiver, a memory, and a processor communicatively coupled to the transceiver and the memory, wherein the processor and the memory are configured to perform any one of aspects 20 through 29.

Aspect 34: An apparatus configured for wireless communication comprising at least one means for performing any one of aspects 20 through 29.

Aspect 35: A non-transitory computer-readable medium storing computer-executable code, comprising code for causing an apparatus to perform any one of aspects 20 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 8-10, and 14 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment, the method comprising:
    transmitting a first indication to a base station, wherein the first indication indicates that the user equipment supports full-duplex communication on a single carrier;
    receiving a second indication from the base station, wherein the second indication specifies that the user equipment is to communicate first information via a set of symbols in a slot associated with a first bandwidth part (BWP);
    receiving a third indication from the base station after receiving the second indication;
    identifying a change to the first BWP from the third indication; and
    selectively communicating the first information after identifying the change to the first BWP.

2. The method of claim 1, wherein the selectively communicating the first information comprises electing to communicate the first information, the method further comprising:
    determining that the first information is to be communicated via at least one symbol of the set of symbols;
    determining that the change to the first BWP does not affect a communication direction for the at least one symbol; and
    communicating the first information via the at least one symbol after the determining that the change to the first BWP does not affect the at least one symbol.

3. The method of claim 1, wherein the selectively communicating the first information comprises electing to transmit the first information, the method further comprising:
commencing transmission of the first information via the set of symbols; and
delaying, for a period of time after commencing the transmission, a switch from the transmission of the first information to reception of second information via the set of symbols.

4. The method of claim 3, wherein the period of time is based on an uplink channel preparation time.

5. The method of claim 1, wherein the selectively communicating the first information comprises electing to not communicate the first information.

6. The method of claim 5, further comprising:
abstaining from transmitting an acknowledgement for the first information to the base station; or
abstaining from transmitting the first information to the base station.

7. The method of claim 1, wherein the third indication comprises a downlink control information (DCI) that indicates a change in a second BWP associated with at least one symbol of the set of symbols.

8. The method of claim 7, wherein:
the change in the second BWP affects a communication direction scheduled for the first BWP for the at least one symbol; or
the change in the second BWP affects a size of the first BWP.

9. The method of claim 7, wherein:
the first BWP comprises a downlink BWP for receiving the first information; and
the second BWP comprises an uplink BWP for transmitting second information.

10. The method of claim 7, wherein:
the first BWP comprises an uplink BWP for transmitting the first information; and
the second BWP comprises a downlink BWP for receiving second information.

11. The method of claim 1, wherein:
the third indication comprises a downlink control information (DCI) that indicates the change to the first BWP for at least one symbol of the set of symbols.

12. The method of claim 1, wherein the third indication comprises a downlink control information (DCI) that indicates:
that at least one symbol of the set of symbols scheduled for the first BWP for receiving the first information is scheduled for transmitting second information; or
that at least one symbol of the set of symbols scheduled for the first BWP for transmitting the first information is scheduled for receiving second information.

13. The method of claim 1, wherein the third indication comprises a slot format indicator (SFI) that indicates:
that at least one symbol of the set of symbols scheduled for the first BWP for receiving the first information is reserved for transmitting; or
that at least one symbol of the set of symbols scheduled for the first BWP for transmitting the first information is reserved for receiving.

14. The method of claim 1, wherein:
the first information is assigned a first priority;
the third indication schedules a second communication assigned a second priority; and
the selectively communicating the first information is based on whether the first priority is a higher priority than the second priority.

15. The method of claim 1, wherein:
the second indication schedules a downlink reception for the user equipment that is assigned a first priority;
the third indication schedules an uplink transmission for the user equipment that is assigned a second priority; and
the selectively communicating the first information comprises selectively receiving the first information based on whether the first priority is a higher priority than the second priority.

16. The method of claim 1, wherein:
the second indication schedules an uplink transmission for the user equipment that is assigned a first priority;
the third indication schedules a downlink reception for the user equipment that is assigned a second priority; and
the selectively communicating the first information comprises selectively transmitting the first information based on whether the first priority is a higher priority than the second priority.

17. The method of claim 1, wherein the second indication schedules:
a downlink reception for a physical downlink control channel (PDCCH), a physical downlink shared channel (PDSCH), or a channel state information reference signal (CSI-RS); or
an uplink transmission for a physical uplink control channel (PUCCH), a physical uplink shared channel (PUSCH), or a sounding reference signal (SRS).

18. The method of claim 1, wherein:
the change to the first BWP does not affect a communication direction for at least one symbol of the set of symbols; and
the selectively communicating the first information comprises communicating the first information via the at least one symbol of the set of symbols.

19. A user equipment, comprising:
a transceiver;
a memory; and
a processor communicatively coupled to the transceiver and the memory, wherein the processor and the memory are configured to:
transmit a first indication to a base station via the transceiver, wherein the first indication indicates that the user equipment supports full-duplex communication on a single carrier;
receive a second indication from the base station via the transceiver, wherein the second indication specifies that the user equipment is to communicate first information via a set of symbols in a slot associated with a first bandwidth part (BWP);
receive a third indication from the base station via the transceiver after the second indication is received;
identify a change to the first BWP from the third indication; and
selectively communicate the first information after the change to the first BWP is identified.

20. A method for wireless communication at a base station, the method comprising:
receiving a first indication from a user equipment, wherein the first indication indicates that the user equipment supports full-duplex communication on a single carrier;
generating a second indication that specifies that the user equipment is to communicate first information during a set of symbols in a slot associated with a first bandwidth part (BWP);
transmitting the second indication to the user equipment;

generating a third indication that indicates a change to the first BWP;

transmitting the third indication to the user equipment after transmitting the second indication; and communicating with the user equipment after transmitting the third indication.

21. The method of claim 20, wherein:

the communicating with the user equipment comprises communicating the first information;

the first information is scheduled to be communicated via at least one symbol of the set of symbols; and the change to the first BWP does not affect a communication direction for the at least one symbol.

22. The method of claim 20, wherein the communicating with the user equipment comprises:

commencing receiving of the first information via the set of symbols; and delaying, for a period of time after commencing the receiving of the first information, a switch from the receiving of the first information to transmitting second information via the set of symbols.

23. The method of claim 20, wherein the communicating with the user equipment comprises communicating second information associated with the change to the first BWP.

24. The method of claim 23, wherein the third indication comprises a downlink control information (DCI) that indicates a change in a second BWP associated with at least one symbol of the set of symbols.

25. The method of claim 23, wherein the third indication comprises a downlink control information (DCI) that indicates a change in the first BWP for at least one symbol of the set of symbols.

26. The method of claim 20, wherein the first information is assigned a first priority, the method further comprising:

determining that a second communication is assigned a second priority that is a higher priority than the first priority; and electing to send the third indication to schedule the second communication after determining that the second communication is assigned the second priority that is a higher priority than the first priority.

27. The method of claim 20, wherein the second indication schedules a downlink reception for the user equipment that is assigned a first priority, the method further comprising:

determining that an uplink transmission is assigned a second priority that is a higher priority than the first priority; and electing to send the third indication to schedule the uplink transmission after determining that the uplink transmission is assigned the second priority that is a higher priority than the first priority.

28. The method of claim 20, wherein the second indication schedules an uplink transmission for the user equipment that is assigned a first priority, the method further comprising:

determining that a downlink transmission is assigned a second priority that is a higher priority than the first priority; and electing to send the third indication to schedule the downlink transmission after determining that the downlink transmission is assigned the second priority that is a higher priority than the first priority.

29. The method of claim 20, wherein the transmitting of the second indication is conditioned on the receiving of the first indication indicating that the user equipment supports the full-duplex communication on the single carrier in an unpaired spectrum.

30. A base station, comprising:

a transceiver;

a memory; and a processor communicatively coupled to the transceiver and the memory, wherein the processor and the memory are configured to:

receive a first indication from a user equipment via the transceiver, wherein the first indication indicates that the user equipment supports full-duplex communication on a single carrier;

generate a second indication that specifies that the user equipment is to communicate first information during a set of symbols in a slot associated with a first bandwidth part (BWP);

transmit the second indication to the user equipment via the transceiver;

generate a third indication that indicates a change to the first BWP;

transmit the third indication to the user equipment via the transceiver after the second indication is transmitted; and communicate with the user equipment via the transceiver after the third indication is transmitted.

* * * * *